(12) United States Patent
Song et al.

(10) Patent No.: US 12,273,586 B2
(45) Date of Patent: Apr. 8, 2025

(54) MULTIMEDIA APPARATUS AND CAST METHOD

(71) Applicant: Hisense Visual Technology Co., Ltd., Shandong (CN)

(72) Inventors: Ziquan Song, Shandong (CN); Xiujuan Pang, Shandong (CN); Xuesheng Zhu, Shandong (CN); Chengchuang Xiao, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 386 days.

(21) Appl. No.: 17/804,257

(22) Filed: May 26, 2022

(65) Prior Publication Data
US 2022/0286731 A1    Sep. 8, 2022

Related U.S. Application Data

(63) Continuation of application No. PCT/CN2021/081561, filed on Mar. 18, 2021.

(30) Foreign Application Priority Data

| Mar. 20, 2020 | (CN) | 202010199814.8 |
| Jun. 9, 2020 | (CN) | 202010519510.5 |
| Jun. 10, 2020 | (CN) | 202010522106.3 |

(51) Int. Cl.
*H04L 12/66* (2006.01)
*H04M 3/00* (2024.01)
(Continued)

(52) U.S. Cl.
CPC ... *H04N 21/4392* (2013.01); *H04N 21/44004* (2013.01)

(58) Field of Classification Search
CPC ....... H04N 21/43615; H04N 21/41407; H04N 21/4222; H04N 21/4383; H04N 21/4622;
(Continued)

(56) References Cited

U.S. PATENT DOCUMENTS

| 5,666,555 | A | 9/1997 | Okazaki et al. |
| 9,043,822 | B1 * | 5/2015 | Calzone ............... H04N 21/632 725/14 |

(Continued)

FOREIGN PATENT DOCUMENTS

| CN | 101233747 A | 7/2008 |
| CN | 101489091 A | 7/2009 |

(Continued)

OTHER PUBLICATIONS

International Search Report, mailed Jun. 7, 2021, from PCT/CN2021/081561 filed Mar. 18, 2021.

*Primary Examiner* — Kharye Pope
(74) *Attorney, Agent, or Firm* — ANOVA LAW GROUP, PLLC

(57) ABSTRACT

The present application is directed to a multimedia apparatus and a cast method. The method includes: during a cast process between a display apparatus and multiple devices, determining a target device from among the multiple devices; storing audio data which is sent from the target device in an audio buffer, and discarding audio data sent from other devices; storing video data which is sent from the multiple devices in video buffers corresponding to the devices; and playing the audio data in the audio buffer, and displaying video data in at least one video buffer.

20 Claims, 23 Drawing Sheets

(51) Int. Cl.
*H04M 5/00* (2006.01)
*H04N 21/439* (2011.01)
*H04N 21/44* (2011.01)

(58) Field of Classification Search
CPC ............. H04N 21/47; H04N 21/64322; H04N 21/4363; H04N 21/4126; H04L 65/60; H04L 2012/2849; H04L 65/612; H04L 65/611; H04L 67/1095; H04W 84/12
See application file for complete search history.

(56) References Cited

U.S. PATENT DOCUMENTS

| | | | |
|---|---|---|---|
| 10,965,984 B1* | 3/2021 | Shams | H04N 21/84 |
| 2011/0116540 A1* | 5/2011 | O'Connor | H04N 21/47 |
| | | | 725/54 |
| 2012/0039219 A1 | 2/2012 | Elwood | |
| 2013/0054795 A1* | 2/2013 | Kang | H04L 65/612 |
| | | | 709/224 |
| 2013/0097516 A1* | 4/2013 | Hong | H04M 1/72409 |
| | | | 709/217 |
| 2013/0298171 A1* | 11/2013 | Takeda | H04N 5/91 |
| | | | 725/74 |
| 2014/0149565 A1* | 5/2014 | Piegay | H04L 65/65 |
| | | | 709/223 |
| 2014/0178028 A1* | 6/2014 | Park | H04L 65/1093 |
| | | | 386/201 |
| 2014/0223470 A1* | 8/2014 | Kim | H04N 21/4622 |
| | | | 725/32 |
| 2016/0134941 A1* | 5/2016 | Selvaraj | H04N 21/26283 |
| | | | 725/40 |
| 2016/0170709 A1 | 6/2016 | Jang et al. | |
| 2016/0295296 A1* | 10/2016 | Zhu | H04N 21/643 |
| 2017/0019445 A1* | 1/2017 | Panje | H04L 65/80 |
| 2017/0171618 A1* | 6/2017 | Fryer | H04N 21/6125 |

FOREIGN PATENT DOCUMENTS

| | | |
|---|---|---|
| CN | 101494777 A | 7/2009 |
| CN | 101510990 A | 8/2009 |
| CN | 101588488 A | 11/2009 |
| CN | 101646221 A | 2/2010 |
| CN | 201887900 U | 6/2011 |
| CN | 102959979 A | 3/2013 |
| CN | 103200413 A | 7/2013 |
| CN | 104717522 A | 6/2015 |
| CN | 105005722 A | 10/2015 |
| CN | 105916015 A | 8/2016 |
| CN | 106488294 A | 3/2017 |
| CN | 107276777 A | 10/2017 |
| CN | 108256312 A | 7/2018 |
| CN | 108737690 A | 11/2018 |
| CN | 109842959 A | 6/2019 |
| CN | 109963178 A | 7/2019 |
| CN | 110069229 A | 7/2019 |
| CN | 110381197 A | 10/2019 |
| CN | 111049848 A | 4/2020 |
| CN | 111711843 A | 9/2020 |

* cited by examiner

MULTIMEDIA APPARATUS AND CAST METHOD

CROSS REFERENCE TO RELATED APPLICATIONS

The application is a continuation application of PCT/CN2021/081561, which claims priorities to Chinese Patent Applications No. 202010199814.8, filed on Mar. 20, 2020, No. 202010519510.5, filed on Jun. 9, 2020, and No. 202010522106.3, filed on Jun. 10, 2020, the entire contents of which are incorporated herein by reference.

FIELD

The disclosure relates to smart device technology, in particular to a multimedia apparatus and a cast method.

BACKGROUND

In a multiple path cast scenario where screen contents from multiple devices can cast to a multimedia apparatus simultaneously, when the multiple devices are connected with the multimedia apparatus, the multiple devices will send their video data to the multimedia apparatus.

When the multimedia apparatus receives the audio data from the multiple devices, the multimedia apparatus requests for buffers to store corresponding audio data. That is, the multimedia apparatus is connected with the multiple devices and requests for multiple corresponding buffers. When the multimedia apparatus plays audio, data are read from a selected corresponding audio storage buffer and sent to an audio playing interface.

SUMMARY

The disclosure provides a multimedia apparatus and a cast method.

In a first aspect, a multimedia apparatus according to an embodiment of the disclosure includes: a processor, configured to determine a target device from a plurality of devices during a cast process with the plurality of devices, store audio data sent from the target device in an audio buffer and discard audio data sent from other devices in the plurality of devices except the target device, and store video data sent from the plurality of devices in video buffers corresponding to the plurality of devices, wherein a video buffer of the video buffers is assigned to a device of the plurality of devices; a display, configured to display at least one path of video data in at least one video buffer of the video buffers; and an audio output circuit, configured to play the audio data in the audio buffer.

In a second aspect, a cast method according to an embodiment of the disclosure is applied to a multimedia apparatus and includes: determining a target device from a plurality of devices during a cast process with the plurality of devices, storing audio data sent from the target device in an audio buffer and discard audio data sent from other devices in the plurality of devices except the target device, and storing video data sent from the plurality of devices in video buffers corresponding to the plurality of devices, wherein a video buffer of the video buffers is assigned to a device of the plurality of devices; displaying at least one path of video data in at least one video buffer of the video buffers; and playing the audio data in the audio buffer.

DETAILED DESCRIPTION OF THE EMBODIMENTS

In order to make those ordinarily skilled in the art better understand schemes of the disclosure, the schemes in the embodiments of the disclosure will be described clearly and completely below with reference to the drawings.

Figure 1:
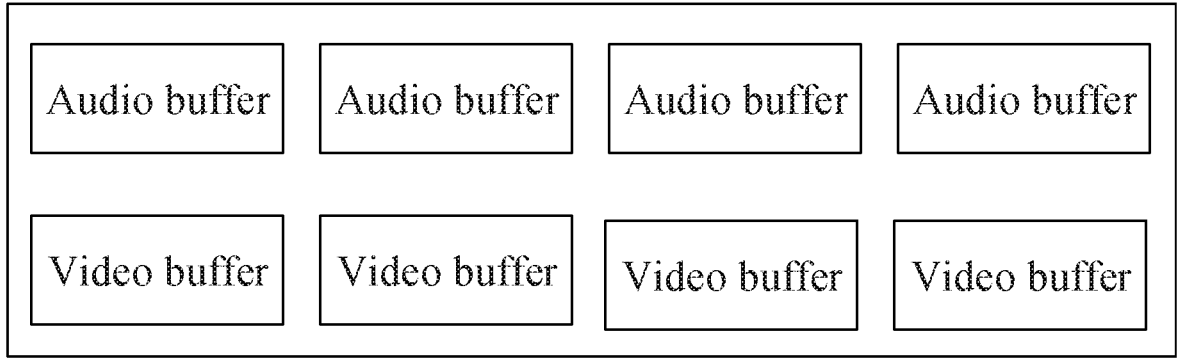
FIG. 1 is a schematic diagram of a memory of a multimedia apparatus during a cast process in related art.

At present, during a cast process, taking four devices being connected with a multimedia apparatus for example, when each device sends data to the multimedia apparatus, the multimedia apparatus requests for one audio buffer and one video buffer, as shown in FIG. 1, eight buffers, i.e., four audio buffers and four video buffers, may be requested from a memory of the multimedia apparatus for the four devices. Each of the audio buffers stores corresponding audio data, and each of the video buffers stores corresponding video data.

Based on this, an embodiment of the disclosure provides a television, a multimedia apparatus and a cast method. One target device is selected, audio data from the target device is stored in an audio buffer, and audio data from other devices are discarded, so a memory of the multimedia apparatus is saved without influencing normal playing.

Figure 2:
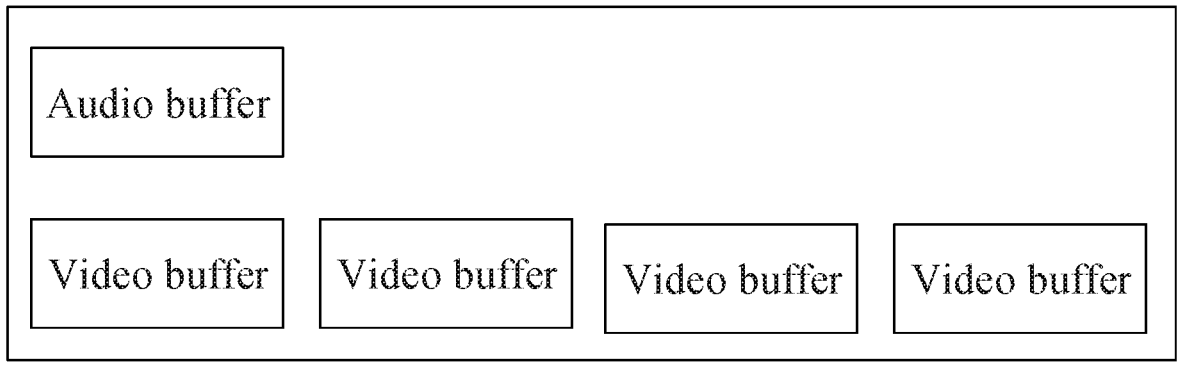
FIG. 2 is a schematic diagram of a memory: in a multimedia apparatus during a cast process according to an embodiment of the disclosure.

Taking four devices being connected with the multimedia apparatus for example, as shown in FIG. 2, the memory of the multimedia apparatus in the embodiment of the disclosure includes one audio buffer and four video buffers, the audio buffer stores audio data from the target device, and the four video buffers store video data from the four corresponding devices.

As shown in FIG. 1 and FIG. 2, according to the disclosure, especially during cast between many devices and a multimedia apparatus, the memory of the multimedia apparatus may be greatly saved.

The multimedia apparatus is described in detail below with reference to the drawings.

Figure 3:
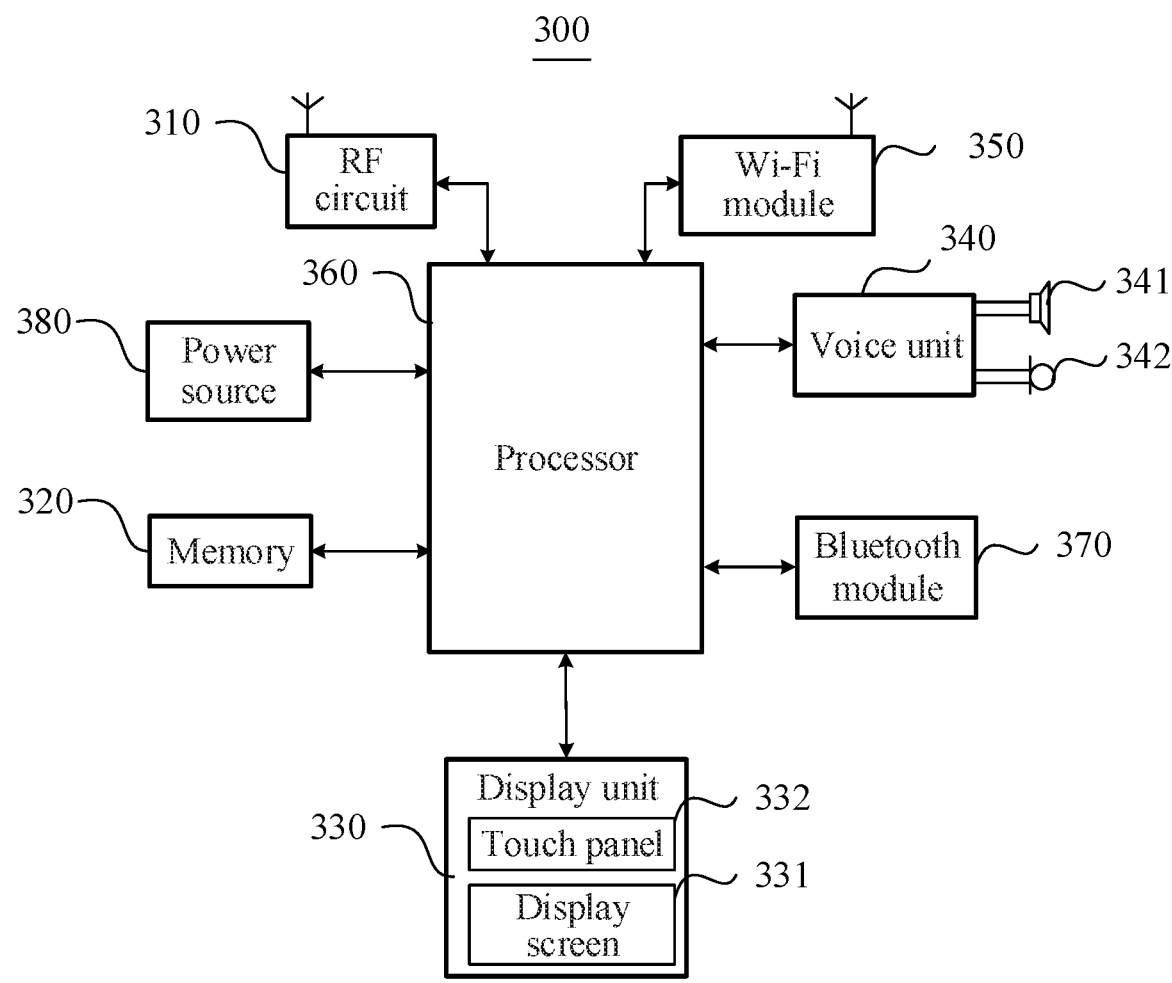
FIG. 3 is a schematic diagram of connection between a television and a mobile phone during a cast process according to an embodiment of the disclosure.

It should be understood that the multimedia apparatus 300 shown in FIG. 3 is only an example and may have more or less components than what are shown in FIG. 3, may combine two or more components, or may have different component configurations. Various components shown in the figure may be realized in hardware, software or a combination of the hardware and the software including one or more signal processors and/or special-purpose integrated circuits.

FIG. 3 shows, for example, a block diagram of hardware configuration of a multimedia apparatus 300 according to an example. As shown in FIG. 3, the multimedia apparatus 300 includes: a radio frequency (RF) circuit 310, a memory 320, a display unit 330, a voice unit 340, a wireless fidelity (Wi-Fi) module 350, a processor 360, a Bluetooth module 370, a power source 380 and other components.

The processor 360 is a control center of the multimedia apparatus 300, is connected with all parts in the whole device by using various interfaces and buses, and performs various functions of the multimedia apparatus 300 and processes data by running or executing an application stored in the memory 320 and calling data stored in the memory 320. In some embodiments, the processor 360 may include one or more processing units. The processor 360 may be also integrated with an application processor and a baseband processor. The application processor mainly processes an operation system, a user interface, an application and the like, and the baseband processor mainly processes wireless communication. It may be understood that the above baseband processor may be not integrated into the processor 360. The processor 360 in the disclosure may run the operation system, the application and the cast method in the embodiment of the disclosure. Besides, the processor 360 is coupled with a display unit 330.

For different multimedia apparatuses, the display unit 330 mentioned in the disclosure is different in structure.

Taking television as an example of the multimedia apparatus, the display unit 330 may be configured to receive input number or character information and generate signal input related to user setting and function control of the multimedia apparatus 300. The display unit 330 may include a touch panel 332 on a front side of the multimedia apparatus 300 and may be capable of collecting a touch operation on it or nearby from the user, for example, clicking a button, dragging a scroll box, etc. FIG. 3 shows a structure of a display unit 330 by taking television as an example of a multimedia apparatus.

The display unit 330 may be also configured to display information input from the user or information provided for the user and graphical user interfaces (GUIs) of various menus of the multimedia apparatus 300. Specifically, the display unit 330 may include a display screen 331 on the front side of the multimedia apparatus 300. The display screen 331 may be configured in a form of a liquid crystal display or a light-emitting diode or electronic ink and the like. The display unit 330 may be configured to display various graphical user interfaces in the disclosure. A display screen formed by using the electronic ink is usually called ink screen.

The touch panel 332 may cover the display screen 331, or the touch panel 332 and the display screen 331 may be integrated with each other to realize input and output functions of the multimedia apparatus 300 and to be called a touch display screen for short. A screen made of the electronic ink is the ink screen. The display unit 330 in the disclosure may display the application and corresponding operation steps.

Taking a projector as an example of the multimedia apparatus, the display unit 330 is an imaging system. The imaging system includes a light source, an image display element and a lens. During displaying, the light source irradiates the image display element to generate an image, and then video data are projected onto a wall or a projection screen fabric through the lens.

The voice unit 340 includes a speaker 341 and a microphone 342, and may provide an audio interface between the user and the multimedia apparatus 300. The voice unit 340 may transmit an electrical signal converted from the received audio data to the speaker 341, and the electrical signal is converted to an acoustical signal for output from the speaker 341. The multimedia apparatus 300 may be also provided with a volume button configured to adjust a volume of the acoustical signal. On the other hand, the microphone 342 converts the collected acoustical signal to an electrical signal, the electrical signal is received by the voice unit 340 and converted to audio data, and then the audio data are output to the memory 320 for further processing, for example, the multimedia apparatus is controlled through voice. The microphone 342 in the disclosure may obtain voice from the user.

The memory 320 may be configured to store software programs and data. The processor 360, by running the software programs or data stored in the memory 320, performing various functions and data processing of the multimedia apparatus 300. The memory 320 may include a high speed random access memory, or may further include a nonvolatile memory, for example, at least one disk storage device, a flash memory device, or other volatile solid state storage devices. The memory 320 stores the operation system enabling the multimedia apparatus 300 to run. The memory 320 in the disclosure may store the operation system and various applications, or may further store codes for performing the cast method in the embodiments of the disclosure.

An RF circuit 310 may be configured to receive and send a signal during message exchange or calling, may receive downlink data from a base station and transmit it to the processor 360 for processing, and may send uplink data to the base station. In general, the RF circuit includes but is not limited to an antenna, at least one amplifier, a transceiver, a coupler, a low noise amplifier, a duplexer and other devices.

Wi-Fi is a short-distance wireless transmission technology, the multimedia apparatus 300 may help the user to receive and send an electronic mail, browse a webpage and access a streaming media, etc. through the Wi-Fi module 350, and the Wi-Fi module 350 provides a wireless broadband Internet access for the user.

The Bluetooth module 370 is configured to perform information interaction with other Bluetooth devices with the Bluetooth module according to a Bluetooth protocol. For example, the multimedia apparatus 300 establishes Bluetooth connection with a wearable electronic device (for example, a smart watch) having a Bluetooth module through the Bluetooth module 370 so as to perform data interaction.

The multimedia apparatus 300 further includes a power source 380 (for example, a battery) for supplying power to all the components. The power source may be connected with the processor 360 through a power management system so that management of functions such as charging, discharging and power consumption is realized through the power management system. The multimedia apparatus 300 may be further provided with a power button used for functions of starting and turning off a device, and locking a screen.

In the disclosure, the above elements may have the following functions.

The processor 360 is configured to determine a target device from a plurality of devices during a process of casting with the plurality of devices, store audio data sent from the target device in an audio buffer and discard audio data sent from other devices, and store video data sent from the plurality of devices in video buffers corresponding to the plurality of devices.

The display unit 330 is configured to display video data in at least one video buffer.

The voice unit 340 is configured to play the audio data in the audio buffer.

The following takes television as an example of the multimedia apparatus and a mobile phone as an example of the device.

Figure 4:
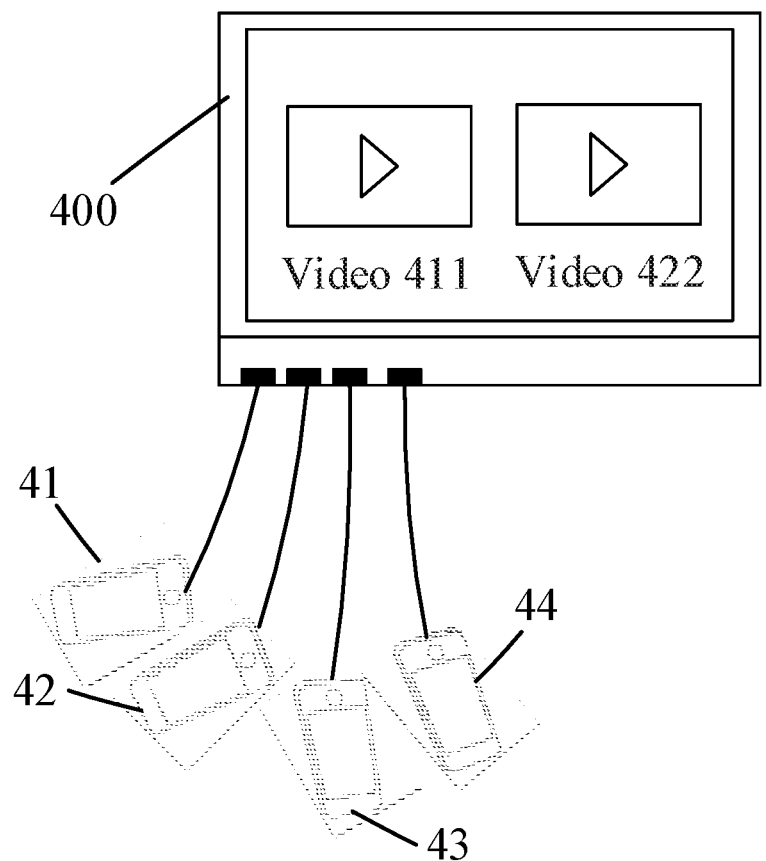
FIG. 4 is a schematic diagram of connection between a projector and a computer during a cast process according to an embodiment of the disclosure.

As shown in FIG. 4, in an example where four mobile phones are connected with a television, the four mobile phones, namely, the mobile phone 41, the mobile phone 42, the mobile phone 43 and the mobile phone 44 are connected with the television 400, the television 400 selects one from the four mobile phones connected thereto as a target mobile phone. For example, the mobile phone 42 is selected as the target mobile phone. The television stores the audio data sent from the mobile phone 42 in the an audio storage region and discards audio data sent from the mobile phone 41, the mobile phone 43 and the mobile phone 44. The television stores video data sent from the four mobile phones in the respective video storage regions corresponding to the respective mobile phones. The mobile phone 41 sends a video 411, the mobile phone 42 sends a video 422, the mobile phone 43 sends a video 433, and the mobile phone 44 sends a video 444. The television 400 reads data from the audio storage region to play an audio from the mobile phone 42, and reads data from the video storage regions to display video data from at least one of the mobile phones on the display screen of the television 400, for example, the video 411 and the video 422 are displayed.

The following takes a projector as an example of the multimedia apparatus and a computer as an example of the device.

Figure 5:
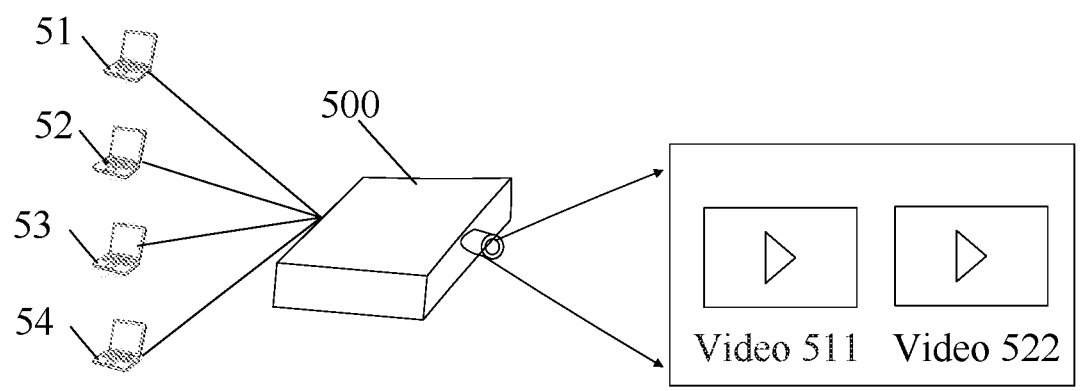
FIG. 5 is a schematic structural diagram of a multimedia apparatus according to an embodiment of the disclosure.

As shown in FIG. 5, taking four computers for example, the four computers, namely, the computer 51, the computer 52, the computer 53 and the computer 54 are connected with the projector 500, the projector 500 selects one from the four computers connected thereto as a target computer. For example, the computer 51 is selected as the target computer. The projector 500 stores audio data sent from the computer 51 in an audio storage region and discards audio data sent from the computer 52, the computer 53 and the computer 54. The projector 500 stores video data sent from the four computers in the respective video storage regions corresponding to the respective computers. The computer 51 sends a video 511, the computer 52 sends a video 522, the computer 53 sends a video 533, and the computer 54 sends a video 544. The projector 500 reads data from the audio storage region to play an audio from the computer 51, and reads data from the video storage regions to display video data from at least one of the computers, for example, the video 511 and the video 522 are displayed.

As for determining the target device, the processor 360 is configured with following functions.

The processor 360 is configured to: take one device selected by the user from the plurality of devices as the target device, or select one device from the plurality of devices as the target device, or select the $N^{th}$ connected device from the plurality of devices as the target device, wherein N is a positive integer.

A mode of taking the device selected by the user from the plurality of devices as the target device needs to be realized by interaction between the display unit 330 and the processor 360. The display unit 330 is further configured to receive a command for selecting a video operated by the user on the multimedia apparatus, and the processor 360 is configured to take the device corresponding to a video selected through the command for selecting a video as the target device in response to the command for selecting a video from the user on the multimedia apparatus.

When the plurality of devices are disconnected from the multimedia apparatus 300, the processor 360 is configured with the following functions.

The processor 360 is further configured to: detect a connection status of the plurality of devices during the casting process between the multimedia apparatus and the plurality of devices simultaneously, delete the audio data in the audio buffer and release memory space of the video buffer corresponding to the target device when it is detected that the target device is disconnected, and determine a new target device from the rest of the devices; and store audio data sent from the new target device in the audio buffer.

The processor 360 is further configured to release memory space of the audio buffer when it is detected that all the devices are disconnected.

Figure 6:
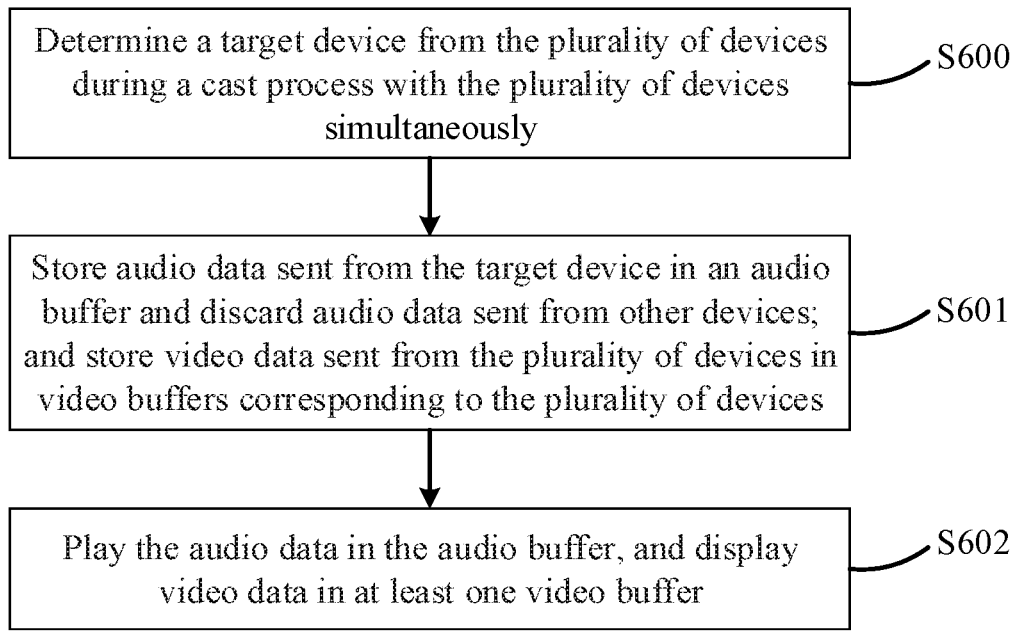
FIG. 6 is a flowchart of a cast method according to an embodiment of the disclosure.

The cast method according to the embodiment of the disclosure is described in detail below with reference to the drawings. As shown in FIG. 6, the method includes the following steps.

S600: a target device is determined from a plurality of devices during a cast process between the multimedia apparatus and the plurality of devices simultaneously.

S601: audio data sent from the target device are stored in an audio buffer, and audio data sent from other devices are discarded; and video data sent from the plurality of devices is stored in the video buffers corresponding to the plurality of devices.

S602: the audio data in the audio buffer is played, and the video data in the at least one of the video buffers is displayed.

When the audio data in the audio buffer is played, the audio data in the audio buffer are read and played, and meanwhile, the video data in at least one of the video buffers are read and displayed. In this way, it is ensured that cast of videos from the plurality of devices connected with the multimedia apparatus is normal and one path of audio data is played, the memory space of the multimedia apparatus is saved.

It is noted that an executing process of the above steps is only an example instead of specifically limiting the disclosure and may be adjusted according to specific requirements.

It may be known from the above that the multimedia apparatus may be the television, the projector and the like.

Figure 7:
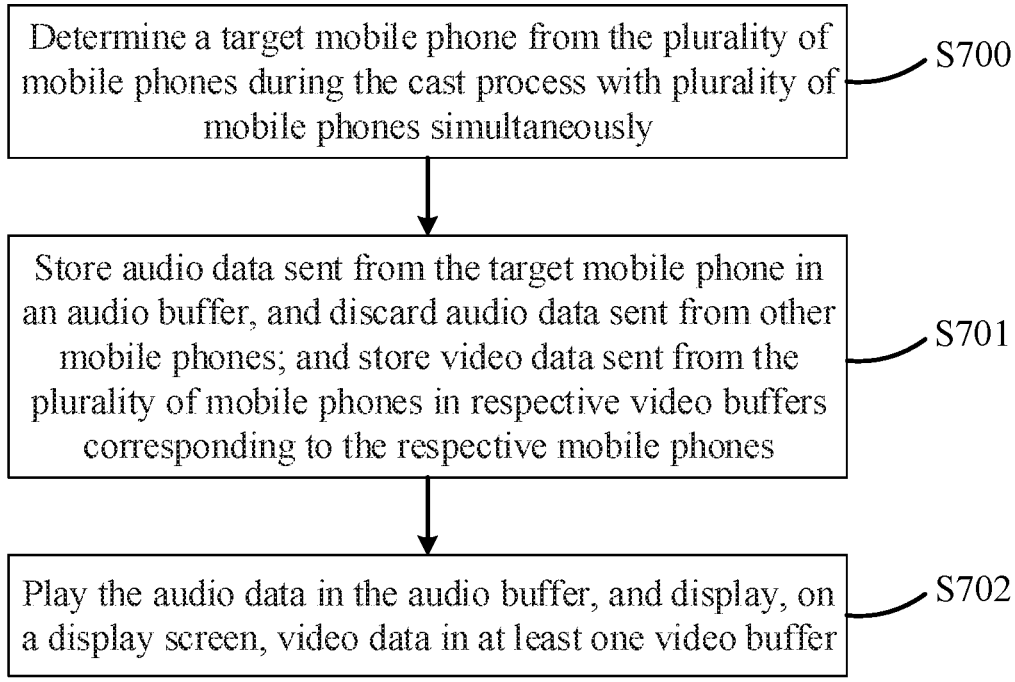
FIG. 7 is a flowchart of a cast method on a television according to an embodiment of the disclosure.

When the multimedia apparatus is the television and the device is the mobile phone, as shown in FIG. 7, a cast process is as follows.

S700: a target mobile phone is determined from a plurality of mobile phones during a cast process between the television and the plurality of mobile phones.

S701: audio data sent from the target mobile phone are stored in the audio buffer, and audio data sent from other mobile phones are discarded; and video data sent from the plurality of mobile phones are stored in respective video buffers corresponding to the respective mobile phones.

S702: the audio data in the audio buffer are played, and the video data in the at least one of the video buffers are displayed on the display screen.

Figure 8:
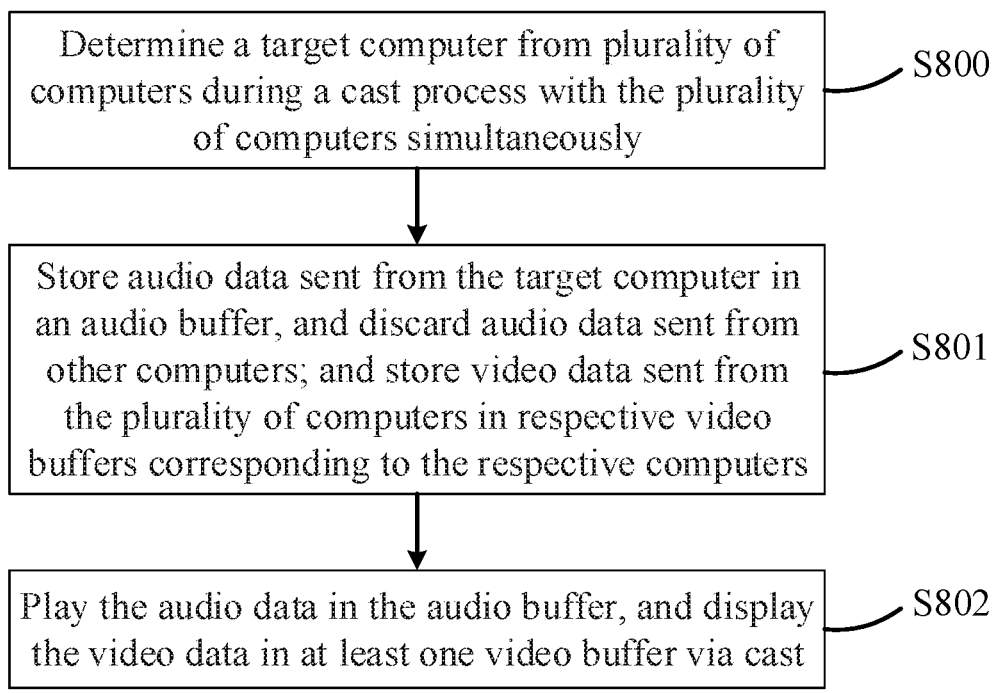
FIG. 8 is a flowchart of a cast method on a projector according to an embodiment of the disclosure.

When the multimedia apparatus is the projector and the device is the computer, as shown in FIG. 8, a specific cast process is as follows.

S800: a target computer is determined from a plurality of computers during a cast process between the multimedia apparatus and the plurality of computers simultaneously.

S801: audio data sent from the target computer are stored in the audio buffer, and audio data sent from other computers are discarded; and video data sent from the plurality of computers are stored in respective video buffers corresponding to the respective computers.

S802: the audio data in the audio buffer are played, and the video data in the at least one of the video buffers are displayed via casting.

Modes of determining the target device from the plurality of devices may include the follows.

Mode 1: the device is selected by the user from the plurality of devices serves as the target device.

The mode provides a user customized mode and provides an option for a user to choose a device to play its sound. The multimedia apparatus, in response to a command for selecting a video from a user, makes the device corresponding to the video selected as the target device.

Taking four devices being connected with the multimedia apparatus as an example, when no target device is selected, all videos are displayed. That is, when the four devices are connected with the multimedia apparatus, the multimedia apparatus automatically requests for four video buffers in the memory, each of the video buffers correspondingly stores video data of each of the four devices, and the multimedia apparatus reads the video data in the four video buffers to display the video data. The display screen of the multimedia apparatus has limited size, so the four videos may be displayed in different interfaces, taking one interface displaying two videos for example, so the four videos need two interfaces or pages to display. The video 1 is a video formed by the video data sent from the device 1, the video 2 is a video formed by the video data sent from the device 2, the video 3 is a video formed by the video data sent from the device 3, and the video 4 is s video formed by the video data sent from the device 4.

Figure 9:
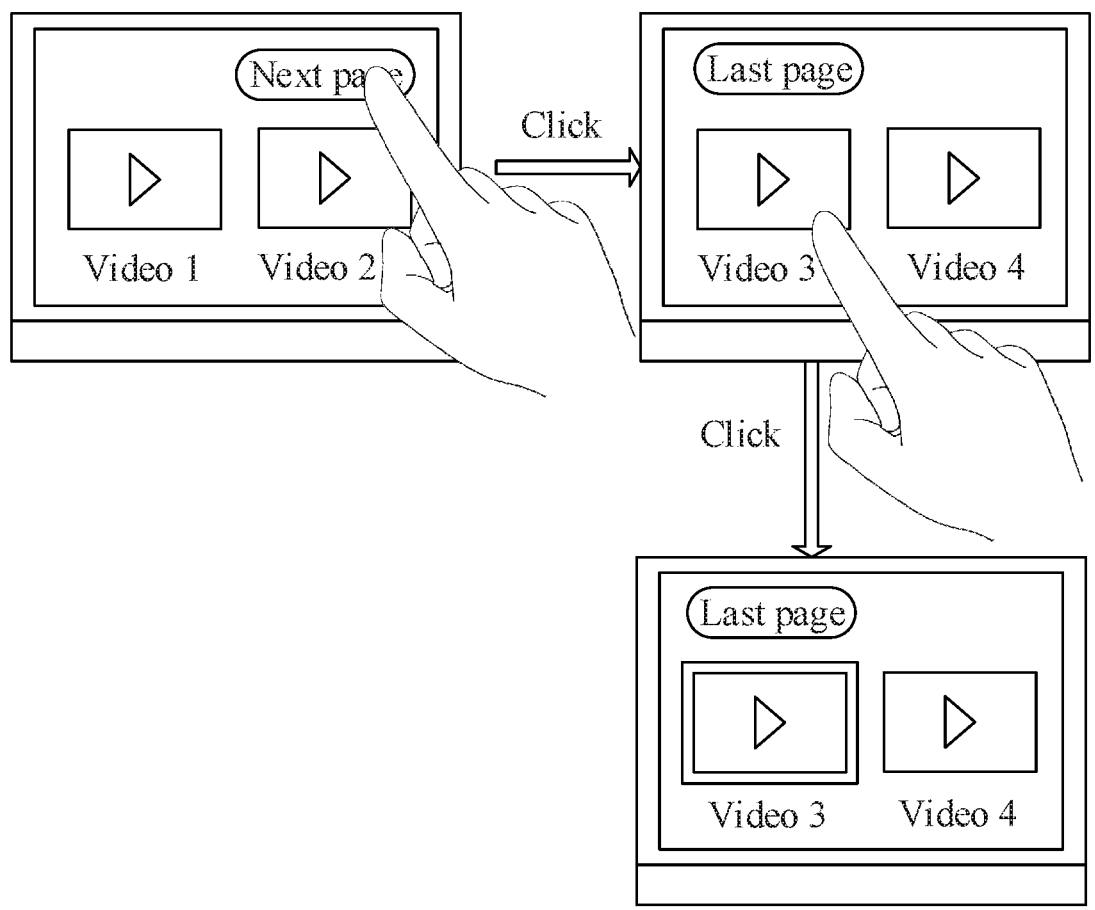
FIG. 9 is a schematic diagram of interaction between a user and a multimedia apparatus when the user selects a target device according to an embodiment of the disclosure.
Figure 10:
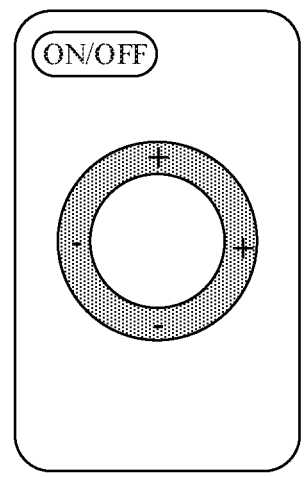
FIG. 10 is a schematic diagram of a remote control for controlling a television according to an embodiment of the disclosure.

As default, displaying is performed in connecting sequence with the multimedia apparatus, the video of the device firstly connected with the multimedia apparatus and the video of the device secondly connected with the multimedia apparatus, e.g., as shown in FIG. 9, the video 1 and the video 2, are displayed in a first page. Meanwhile, a "next page" button is also included in the first page, and when the user clicks the "next page", the video 3 and the video 4 may be displayed.

When the user clicks a selected video, e.g., when the video 3 is selected, in response to a command for selecting video 3 on the multimedia apparatus from the user, the multimedia apparatus highlights a playing region of the selected video 3, meanwhile takes the device 3 corresponding to the video 3 selected as the target device, stores the audio data from the device 3 after the target device is selected, and reads the audio data from the device 3 to play.

Certainly, as for the disclosure, the user may also select the target device through a remote control. As shown in FIG.

10, the remote control has a button for confirming, four directional buttons around the button, namely, up, down, left and right directional button.

The "left" button and the "right" button are configured with a page turning function in the cast context. For example, the user presses the "right" button, the multimedia apparatus enters a next page as a response to the operation of the right button and presses the "left" button, the multimedia apparatus returns to the last page as response to the operation of the left button. A user, when making a selection, may turn pages by operating the "left" button and the "right" button on the remote control to browse videos from the devices connected with the multimedia apparatus, the user selects the video through the "up" button and the "down" button, and the device corresponding to the video selected by the user serves as the target device in response to the video selected by the user.

Figure 11:
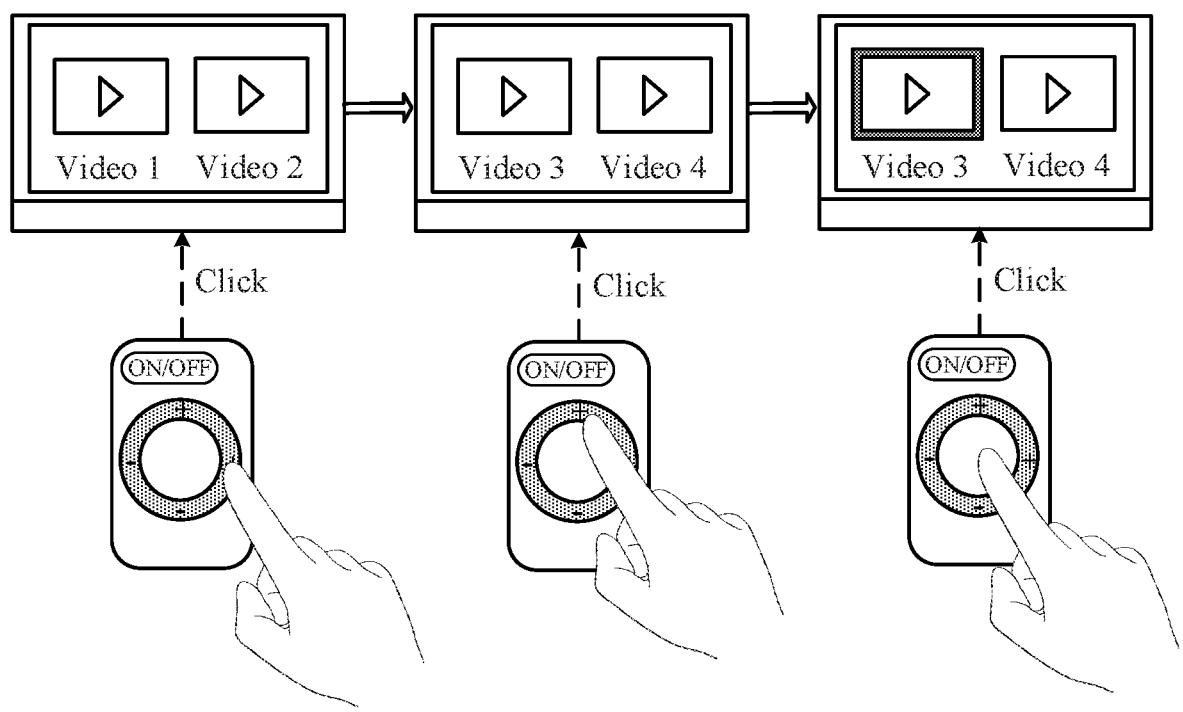
FIG. 11 is a schematic diagram of another interaction between a user and a multimedia apparatus when the user selects a target device according to an embodiment of the disclosure.

Or as shown in FIG. 11, the user turns pages by operating the "left" button and the "right" button on the remote control to browse videos from the devices connected with the multimedia apparatus, and after a selection is made and the user selects the video through the "up" button and the "down" button. For example, the video 3 is selected, the multimedia apparatus, upon receiving a command for selecting a video from the user via an operation of the "up" button or the "down" button, highlights the playing region of the selected video 3, then the device 3 corresponding to the video 3 serves as the target device, for example by clicking the "confirm" button on the remote control, and after the target device is selected, the multimedia apparatus stores the audio data from the device 3 and reads the audio data from the device 3 to play.

It is noted that a type of the multimedia apparatus in the drawings is only an example, is not limited by the disclosure and may have no physical press key.

Figure 12:
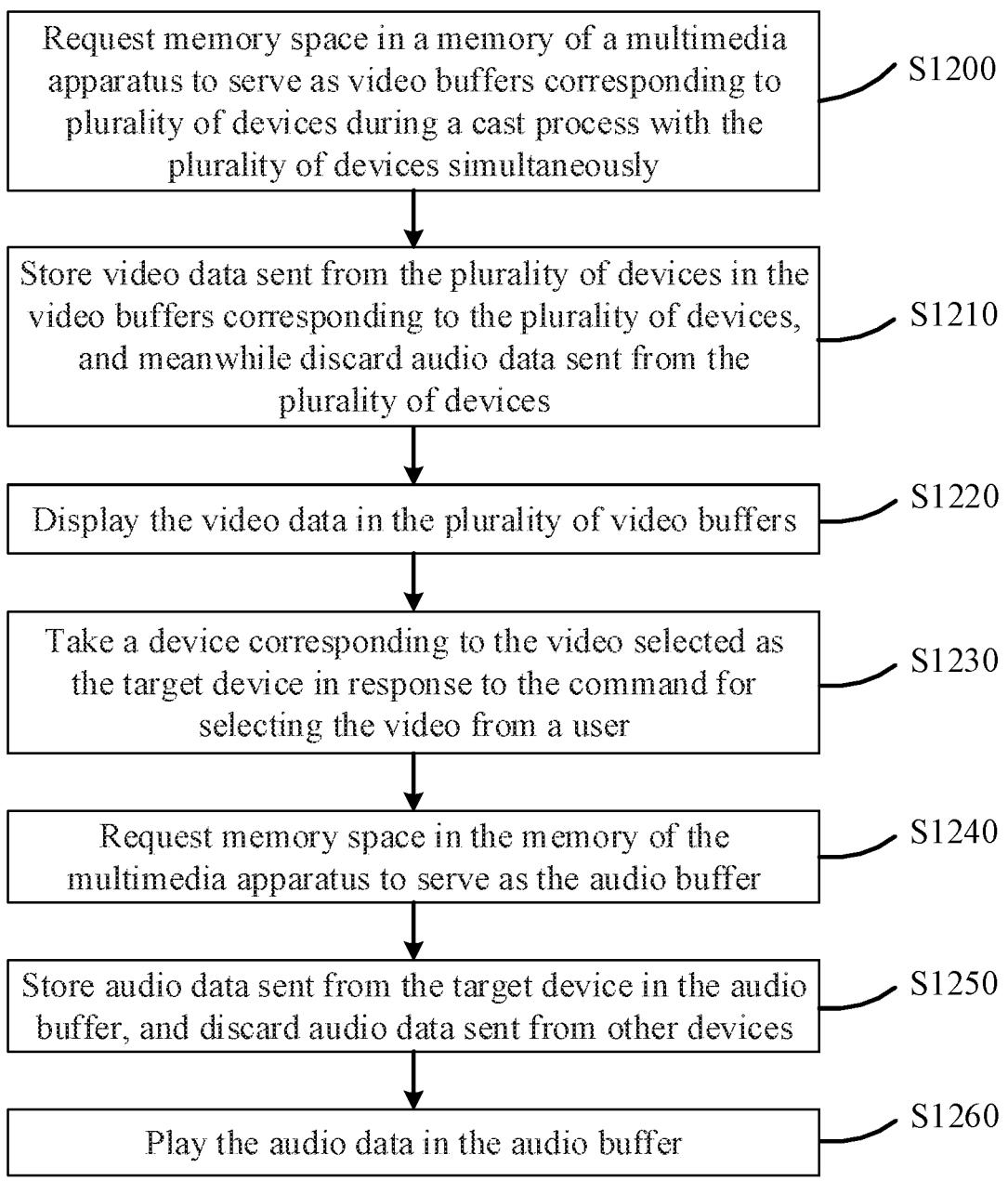
FIG. 12 is a flowchart of a cast method where a target device is selected by a user according to an embodiment of the disclosure.

As shown in FIG. 12, the cast method where the target device is autonomously selected by the user includes the following.

S1200: memory space is requested in the memory of the multimedia apparatus to serve as the video buffers corresponding to the plurality of devices during the casting process between the multimedia apparatus and the plurality of devices simultaneously.

S1210: the video data sent from the plurality of devices are stored in the video buffers corresponding to the plurality of devices, and meanwhile the audio data sent from the plurality of devices are discarded.

S1220: the video data in the plurality of video buffers are displayed.

S1230: in response to a command for selecting a video from a user, the device corresponding to the video selected serves as the target device.

S1240: the memory space is requested in the memory of the multimedia apparatus to serve as the audio buffer.

S1250: the audio data sent from the target device are stored in the audio buffer, and the audio data sent from other devices are discarded.

S1260: the audio data in the audio buffer are played.

In the above mode, the user needs to select the target device according to the video displayed on the multimedia apparatus, so when the user does not select the target device, in view of saving the memory of the multimedia apparatus, the audio buffer is not requested, and meanwhile, all the audio data sent from all the devices connected with the multimedia apparatus are discarded. After the user selects a target device, a flow of automatically requesting the audio buffer is performed, and the memory space of the audio buffer is requested in the memory, so that only storing the target device in the audio buffer may be achieved, and the memory of the multimedia apparatus is saved.

Mode 2: one device is selected from the plurality of devices to serve as the target device.

Figure 13:
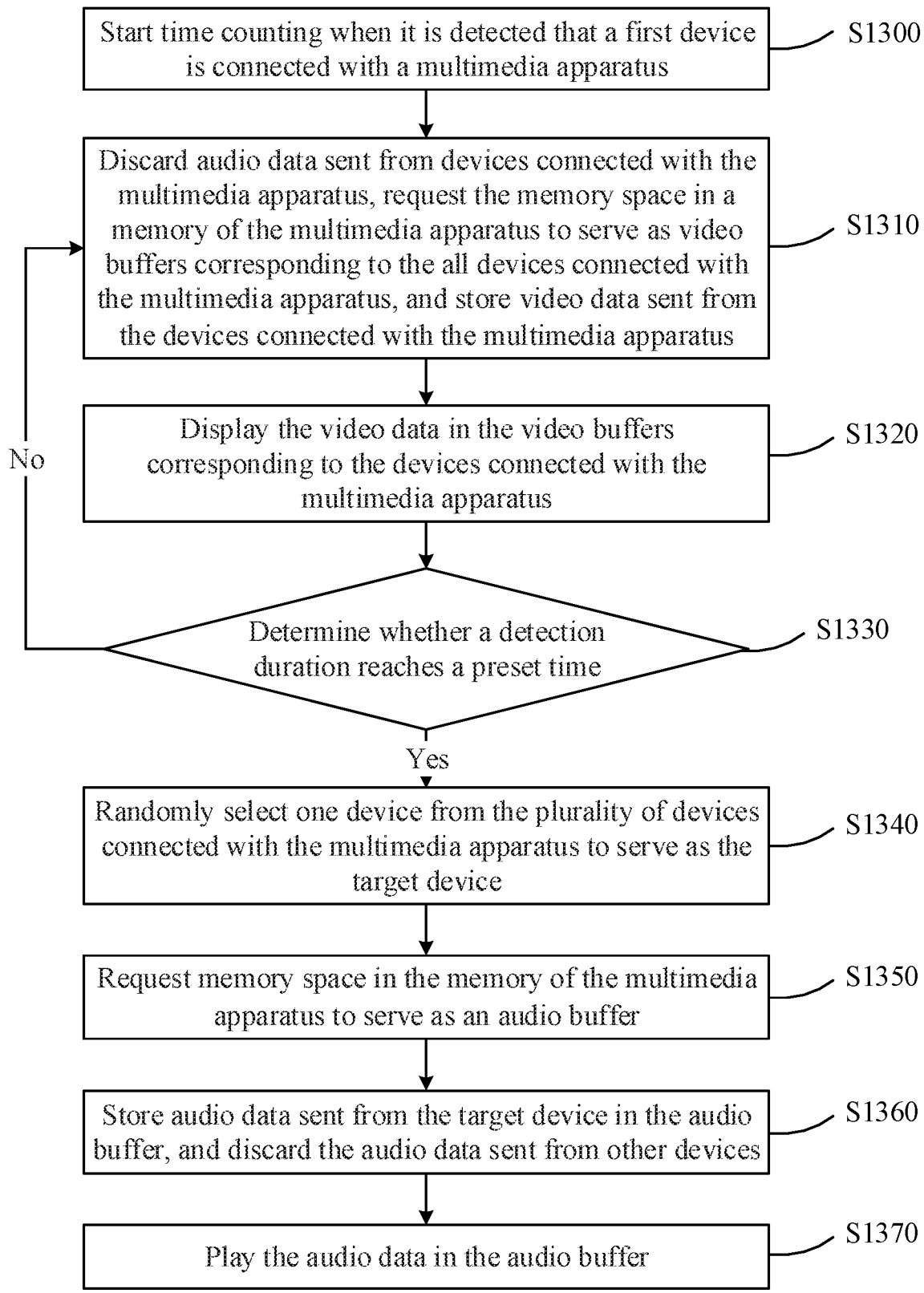
FIG. 13 is a flowchart of a cast method where a device is selected randomly among a plurality of devices as a target device according to an embodiment of the disclosure.

The mode provides an automatic selection mode. The multimedia apparatus may randomly select one device from the plurality of devices to serve as the target device. That is, when the four devices are connected with the multimedia apparatus, one device may be randomly selected from the four devices to serve as the target device. As the audio data and the video data are sent to the multimedia apparatus when the plurality of devices are connected with the multimedia apparatus, the multimedia apparatus needs to determine that connection of all the devices has been completed and then select the target device, and based on this, the multimedia apparatus automatically selects the target device in the cast method, as shown in FIG. 13, including the following.

S1300: time counting is started when it is detected that the first device is connected with the multimedia apparatus.

S1310: the audio data sent from the devices connected with the multimedia apparatus are discarded, the memory space is requested in the memory to serve as the video buffers corresponding to the devices connected with the multimedia apparatus, and the video data sent from the devices connected with the multimedia apparatus are stored.

S1320: the video data in the video buffers corresponding to the devices connected with the multimedia apparatus are displayed.

S1330: whether a detection duration reaches a preset time is determined, if yes, the flow goes to S1340, and if no, the flow goes to S1310.

S1340: one device is randomly selected from the plurality of devices connected with the multimedia apparatus to serve as the target device.

S1350: the memory space is requested in the memory of the multimedia apparatus to serve as the audio buffer.

S1360: the audio data sent from the target device are stored in the audio buffer, and the audio data sent from other devices are discarded.

S1370: the audio data in the audio buffer are played.

Besides, the multimedia apparatus may select a device corresponding to a preset video type from the plurality of devices to serve as the target device.

In details, when it is detected that a device is connected with the multimedia apparatus, the multimedia apparatus requests a video buffer corresponding to the device, stores the video data sent from the device, detects a video type of the video, and determines, when a video type of the video meets the preset video type, the device is determined as the target device. The multimedia apparatus requests for the audio buffer in the memory of the multimedia apparatus, stores the audio data sent from the target device in the audio buffer, meanwhile does not determine whether the videos from devices later sent to the multimedia apparatus meets the preset video type, directly requests for the video buffers corresponding to the devices later and stores the video data sent from the devices later. When the video type of those videos sent later does not meet the preset video type, the multimedia apparatus discards the audio data sent from the devices, continues to detect whether a video type of a next device connected with the multimedia apparatus meets the preset video type till a target device is found, then requests for the audio buffer, stores the audio data sent from the target device in the audio buffer, meanwhile does not determine whether the videos later sent to the multimedia apparatus meets the preset video type, directly requests for the video buffers corresponding to the devices and stores the video data sent from the devices.

Mode 3: the $N^{th}$ connected device is selected from the plurality of devices to serve as the target device, wherein N is a positive integer.

As the devices are connected with the multimedia apparatus one by one, the disclosure proposes the above modes. The $N^{th}$ connected device may be first one or the last one. That is, the first connected device is selected from the plurality of devices to serve as the target device, or the last connected device is selected from the plurality of devices to serve as the target device.

Figure 14:
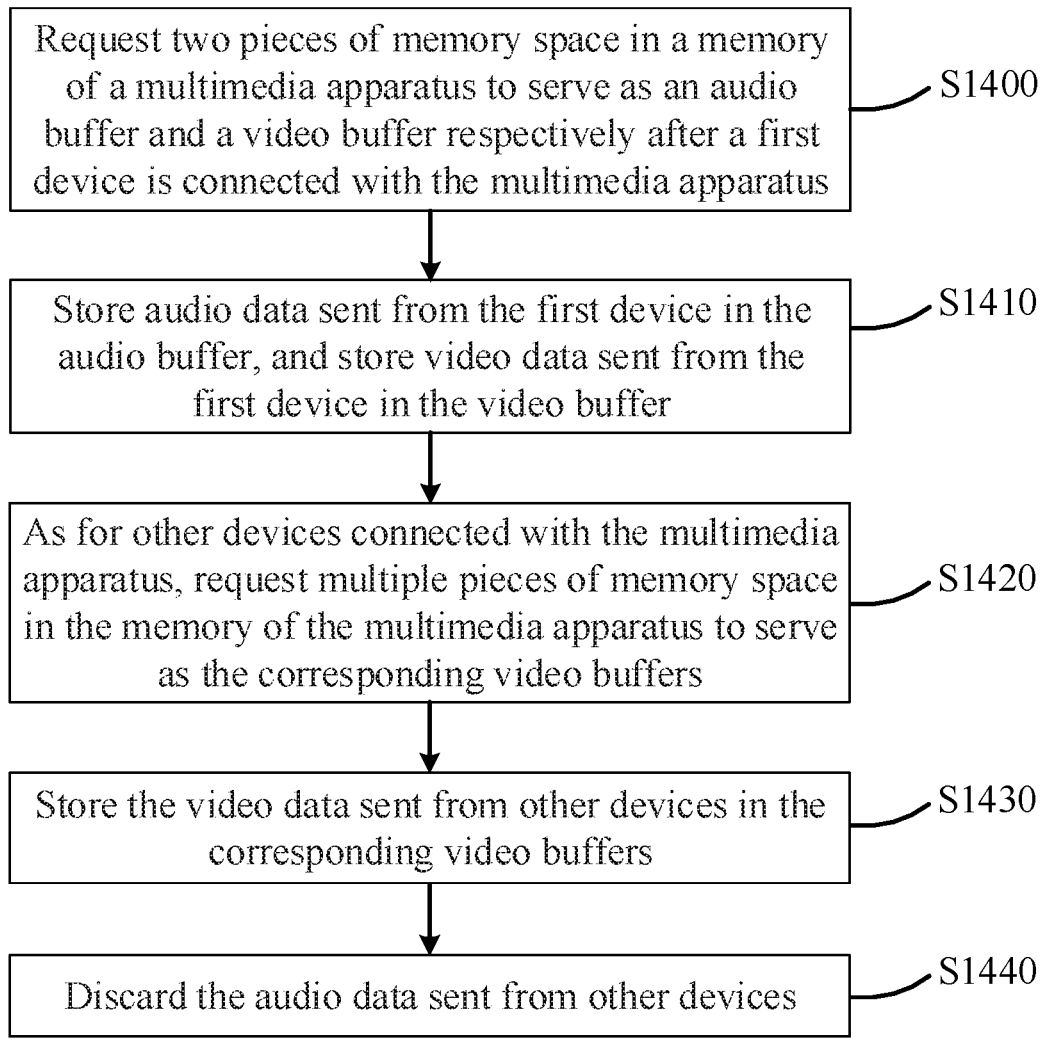
FIG. 14 is a flowchart of a cast method where a first connected device is selected from a plurality of devices as a target device according to an embodiment of the disclosure.

Specifically, the cast method where the multimedia apparatus automatically selects the device firstly (hereafter, the first device) connected with the multimedia apparatus to serve as the target device, as shown in FIG. 14, includes the following.

S1400: two pieces of memory space are requested in the memory of the multimedia apparatus to serve as the audio buffer and the video buffer respectively after the first device is connected with the multimedia apparatus.

S1410: the audio data sent from the first device are stored in the audio buffer, and the video data sent from the first device are stored in the video buffer.

S1420: as for other devices connected with the multimedia apparatus, multiple pieces of memory space are requested in the memory of the multimedia apparatus to serve as the corresponding video buffers.

S1430: the video data sent from other devices are stored in the corresponding video buffers.

S1440: the audio data sent from other devices are discarded.

The device firstly connected with the multimedia apparatus is used as the target device in the disclosure, so the audio data sent from the first device are stored in the audio buffer, the video data sent from the first device are stored in the corresponding video buffer, and as for other devices connected with the multimedia apparatus except the first device, only the video data are stored and the audio data sent from the other devices are discarded.

Figure 15:
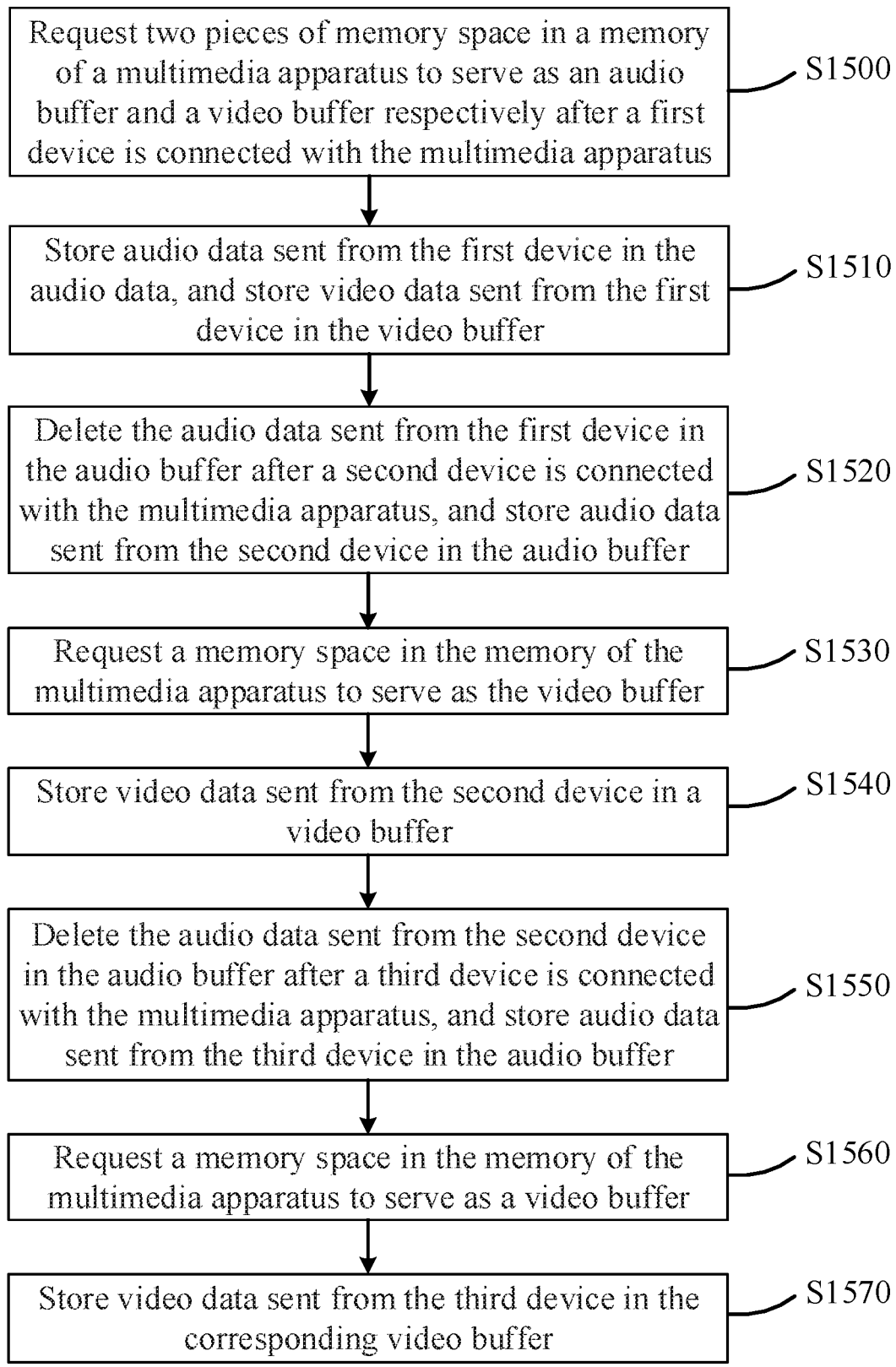
FIG. 15 is a flowchart of a cast method where a last connected device is selected from a plurality of devices as a target device according to an embodiment of the disclosure.

The cast method where the multimedia apparatus automatically selects the device last connected with the multimedia apparatus to serve as the target device, as shown in FIG. 15 and taking three devices connected with the multimedia apparatus for example, includes the following.

S1500: two pieces of memory space are requested for in the memory of the multimedia apparatus to serve as an audio buffer and a video buffer respectively after the first device is connected with the multimedia apparatus.

S1510: the audio data sent from the first device are stored in the audio data, and the video data sent from the first device are stored in the video buffer.

S1520: the audio data sent from the first device in the audio buffer are deleted after the second device is connected with the multimedia apparatus, and the audio data sent from the second device are stored in the audio buffer.

S1530: a memory space is requested for in the memory of the multimedia apparatus to serve as a video buffer.

S1540: the video data sent from the second device are stored in the corresponding video buffer.

S1550: the audio data sent from the second device in the audio buffer are deleted after the third device is connected with the multimedia apparatus, and the audio data sent from the third device are stored in the audio buffer.

S1560: a memory space is requested for in the memory of the multimedia apparatus to serve as a video buffer.

S1570: the video data sent from the third device are stored in the corresponding video buffer.

As for the above method, the disclosure determines the device last connected with the multimedia apparatus as the target device, so after the first device is connected with the multimedia apparatus, there is only one device in the multimedia apparatus, the device, namely, the first connected device is the last connected device, thus, the audio data of the first device are stored in the audio buffer in the disclosure. When the second device is connected with the multimedia apparatus, the multimedia apparatus includes two devices, the second device is the device last connected with the multimedia apparatus, so the audio data sent from the second device need to be stored in the audio buffer, meanwhile, the audio data of the first device stored in the audio buffer are deleted. When the second device is used as the target device, the audio data sent from the first device are discarded, and the video data sent from the first device may continue to be stored in the corresponding video buffer. Likewise, when the third device is connected with the multimedia apparatus, the multimedia apparatus includes three devices, the third device is the device last connected with the multimedia apparatus, so the audio data sent from the third device need to be stored in the audio buffer, meanwhile, the audio buffer of the second device stored in the audio buffer are deleted. When the third device is used as the target device, the audio data sent from the first device and the second device are discarded, the video data sent from the first device may continually stored in the corresponding video buffer, and the video data sent from the second device may continually stored in the corresponding video buffer.

Figure 16:
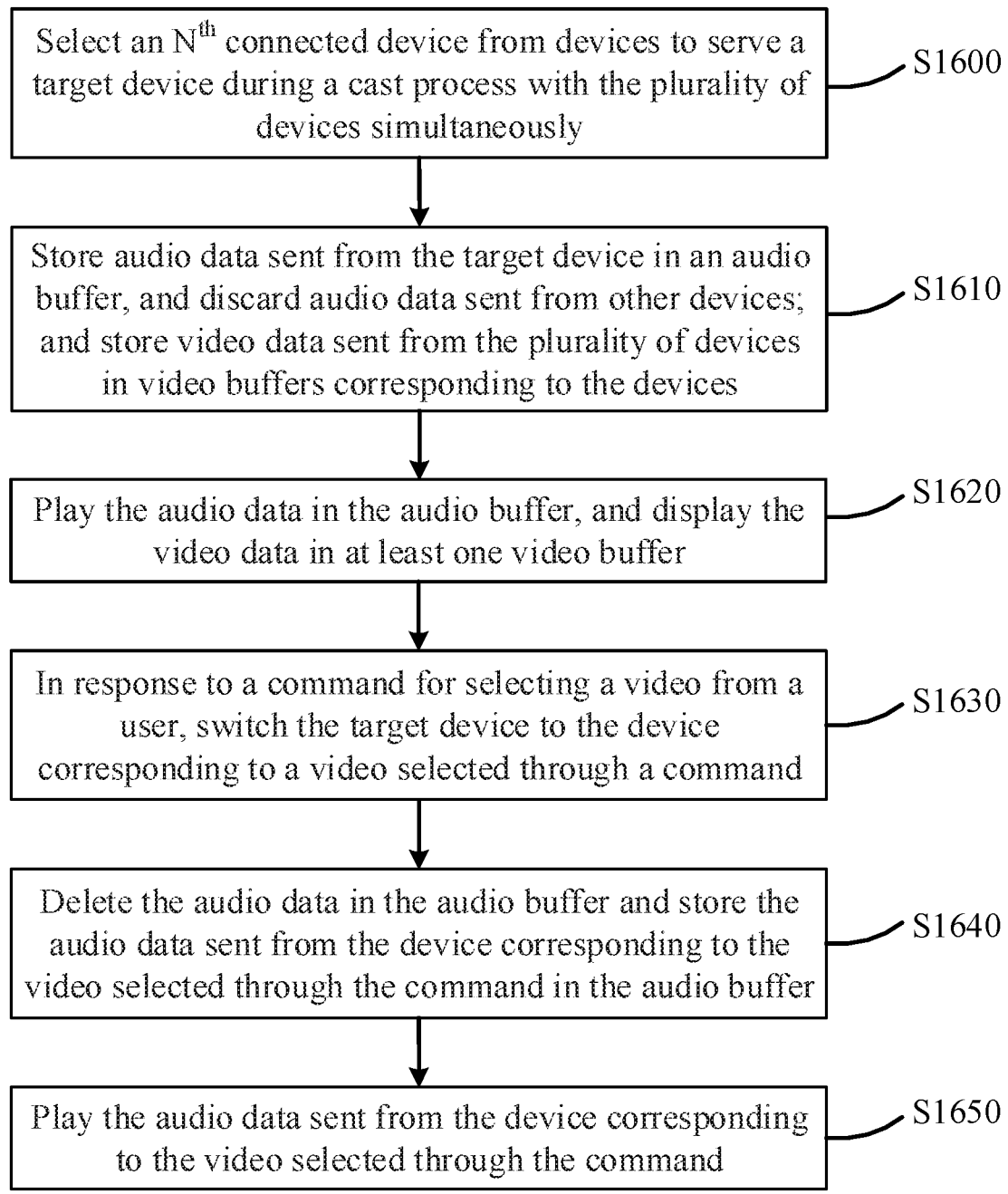
FIG. 16 is a flowchart of a cast method including switching a target device according to an embodiment of the disclosure.

The above modes may be combined for use, for example, when a user wants to check video contents from all the devices connected with the multimedia apparatus and then make a selection, the multimedia apparatus may firstly automatically select one device as the target device, and then the target device is switched to the device selected by the user, and the process is shown in FIG. 16.

S1600: the $N^{th}$ connected device is selected from the plurality of devices to serve as the target device during the cast process between the multimedia apparatus and the plurality of devices simultaneously.

S1610: the audio data sent from the target device are stored in the audio buffer, and the audio data sent from other devices are discarded; and the video data sent from the plurality of devices are stored in the video buffers corresponding to the devices.

S1620: the audio data in the audio buffer are played, and the video data in at least one of the video buffers are displayed.

S1630: in response to a command for selecting a video from a user, the target device is switched to the device corresponding to the video selected through the command.

S1640: the audio data in the audio buffer are deleted and the audio data sent from the device corresponding to the video selected through the command are stored in the audio buffer.

S1650: the audio data sent from the device corresponding to the video selected through the command are played.

When the device is disconnected from the multimedia apparatus, as for the stored data from the device and the memory space allocated for the device for storing the data, the memory space, if not released, still is not available memory space. In view of utilizing the memory space of the multimedia apparatus sufficiently, an embodiment of the disclosure further provides a processing method after a device is disconnected from a multimedia apparatus, including the following.

A connection status of the plurality of devices is detected during a cast process between the multimedia apparatus and the plurality of devices simultaneously.

Audio data in an audio buffer are deleted and a memory space of a video buffer corresponding to the target device is released when it is detected that the target device is disconnected, and a new target device is determined from the rest of devices.

Audio data sent from the new target device are stored in the audio buffer.

After releasing of the memory space is completed, the released memory space is an available space. In the disclosure, when the target device is disconnected, the memory space of the corresponding video buffer is released, so that other data except the video data sent from the target device may use the memory space of the video buffer, and utilization efficiency of the memory is improved.

Meanwhile, in a scenario where the audio data in the audio buffer is not deleted, though the target device is not connected with the multimedia apparatus for cast, the multimedia apparatus plays an audio stored in the audio buffer all the time. A situation that a cast video does not match an audio being played may occur. So in the disclosure, it needs to redetermine a new target device from the rest of devices, an operation of discarding the audio data sent from the new target device is changed to an operation of storing the audio data sent from the new target device in the audio buffer.

When it is detected that a non-target device is disconnected, the memory space of the video buffer corresponding to the non-target device is released. In this way, other data except the video data sent from the non-target device may use the memory space of the video buffer so that the utilization efficiency of the memory is improved.

The non-target device is disconnected, and the audio data of the target device are still stored in the audio buffer, so there is no influence on the audio buffer, only the memory space of the video buffer corresponding to the non-target device needs to be released.

Meanwhile, the memory space of the audio buffer is released when it is detected that all the devices are disconnected.

When all the devices are disconnected, the audio buffer is useless. In view of improving the utilization efficiency of the memory, the memory space of the audio buffer will be released, so that other data may use the memory space of the audio buffer.

An embodiment of the disclosure provides a display apparatus and a control method for establishing connection with the display apparatus, for example, may be suitable for a scenario where a smart device (for example, a mobile phone, a computer, a tablet PC or other devices) and a television device (for example, a smart television) are interacted with each other.

According to some embodiments of the disclosure, a white list and a black list of smart devices are saved in the television for establishing connection to the television. A device in the white list may be directly allowed to connect with the television and the television responds to an operation from the device in the white list or directly displays cast content from the device in the white list. A device in the black list is directly blocked during a connection phase, so the user will not be aware of the device in the black list. As for a device neither in the white list nor in the black list, namely, a new device with a request for establishing connection to the television, a dialog box will pop up during connection so as to enable the user to select "Permit", "Refuse" or "Never permit". Besides, the user may also manually remove the devices in the white list and the black list or edit the white list and the black list in other aspects.

Identifiers of devices in all connection modes are classified and saved in the television, which are classified in the white list and the black list and may be managed. Only a mobile terminal in the white list is allowed to connect with the display apparatus and operation commands from the mobile device can be responded. A device in the black list is directly blocked during a connection phase and the user will not be aware. When a device is neither in the white list nor in the black list, a dialog box will pop up during connection every time so as to make the user select "block", "distrust", or "trust and connect". Interaction safety among multiple screen devices may be greatly improved, and an illegal device is prevented from establishing connection with the smart television, thus the television is prevented from being threatened, and situations, such as the user does not known that the television in the home is illegally connected and controlled by some people or an illegal content is casted onto the television, will be avoided.

Figure 17:
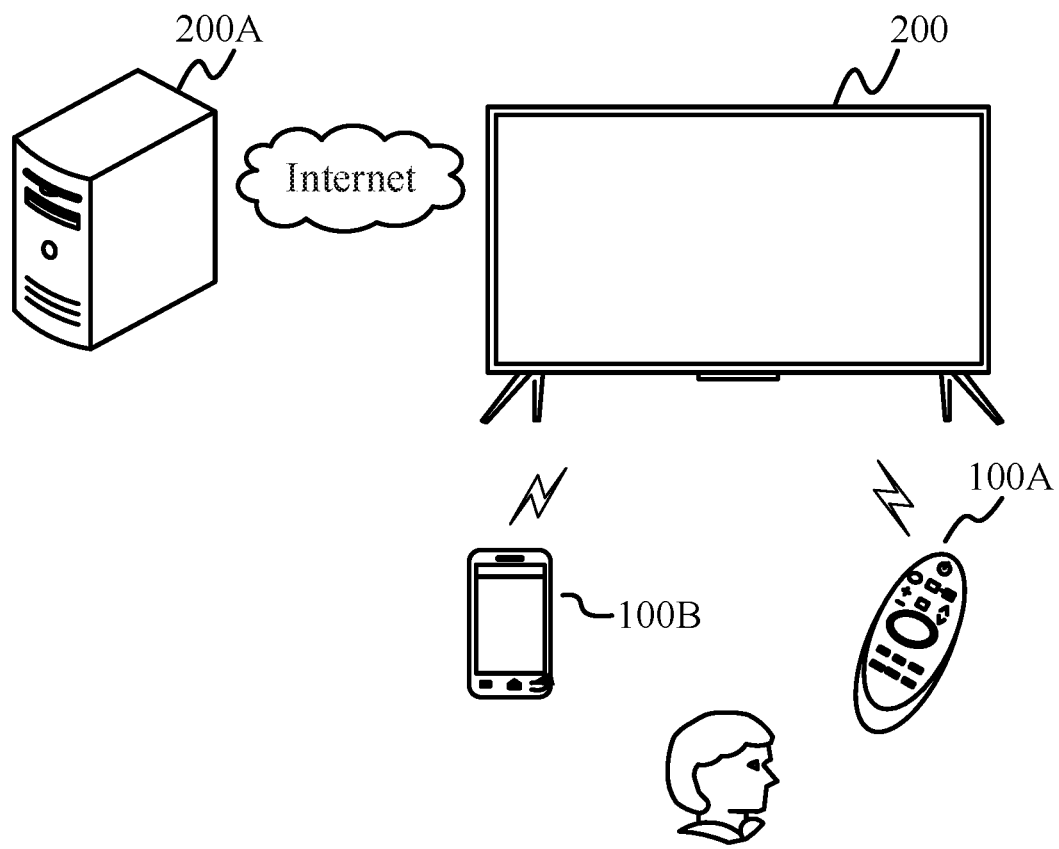
FIG. 17 is schematic diagram of an operation scenario between a display apparatus and a control device according to an embodiment of the disclosure.

FIG. 17 shows a schematic diagram of an operation scenario between a display apparatus and a control device in an embodiment of the disclosure. As shown in FIG. 17, a user may operate the display apparatus 200 through the control device 100.

The control device 100 may be a remote control 100A and includes an infrared protocol communication module or a Bluetooth protocol communication module, and other short-distance communication module, etc., and the display apparatus 200 is controlled in wireless or other wired modes. The user may input a command through press keys of a remote control, voice input, control panel input, etc. so as to control the display apparatus 200.

The control device 100 may be also a smart device, for example, a smart terminal 100B, a tablet PC, a computer, a notebook computer, etc. For example, an application running on the smart device is used to control the display apparatus 200. The application may provide various controls for the user on a screen associated with the smart device through a visual user interface (UI).

For example, a mobile terminal 100B may install an application on the display apparatus 200, communication is realized through a network communication protocol, and purposes of one-to-one control operation and data communication are realized. For example, a control command protocol may be established between the mobile terminal 100B and the display apparatus 200, a remote control keyboard is synchronized onto the mobile terminal 100B, a user interface on the mobile terminal 100B is controlled, and thus a function of controlling the display apparatus 200 is realized. Audio and video contents displayed on the mobile terminal 100B may be transmitted onto the display apparatus 200 to realize a synchronous display.

As shown in FIG. 17, the display apparatus 200 may perform data communication with a server 200A through various communication modes. The display apparatus 200 may be allowed to perform communication through the local area network (LAN), the wireless area network (WLAN) and other networks. The server 200A may provide various contents and interactions for the display apparatus 200. For example, the display apparatus 200 receives software program updates or accesses a digital media library of remote storage, as well as electronic program guide (EPG) interaction, via information exchange.

The display apparatus 200 may be a liquid crystal display, an OLED display, and a projection display apparatus.

The display apparatus 200 may additionally provide a smart network television function supported by a computer besides a broadcast receiving function. For example, the display apparatus may be implemented as a network television, a smart television, an Internet protocol television (IPTV) and the like.

Figure 18:
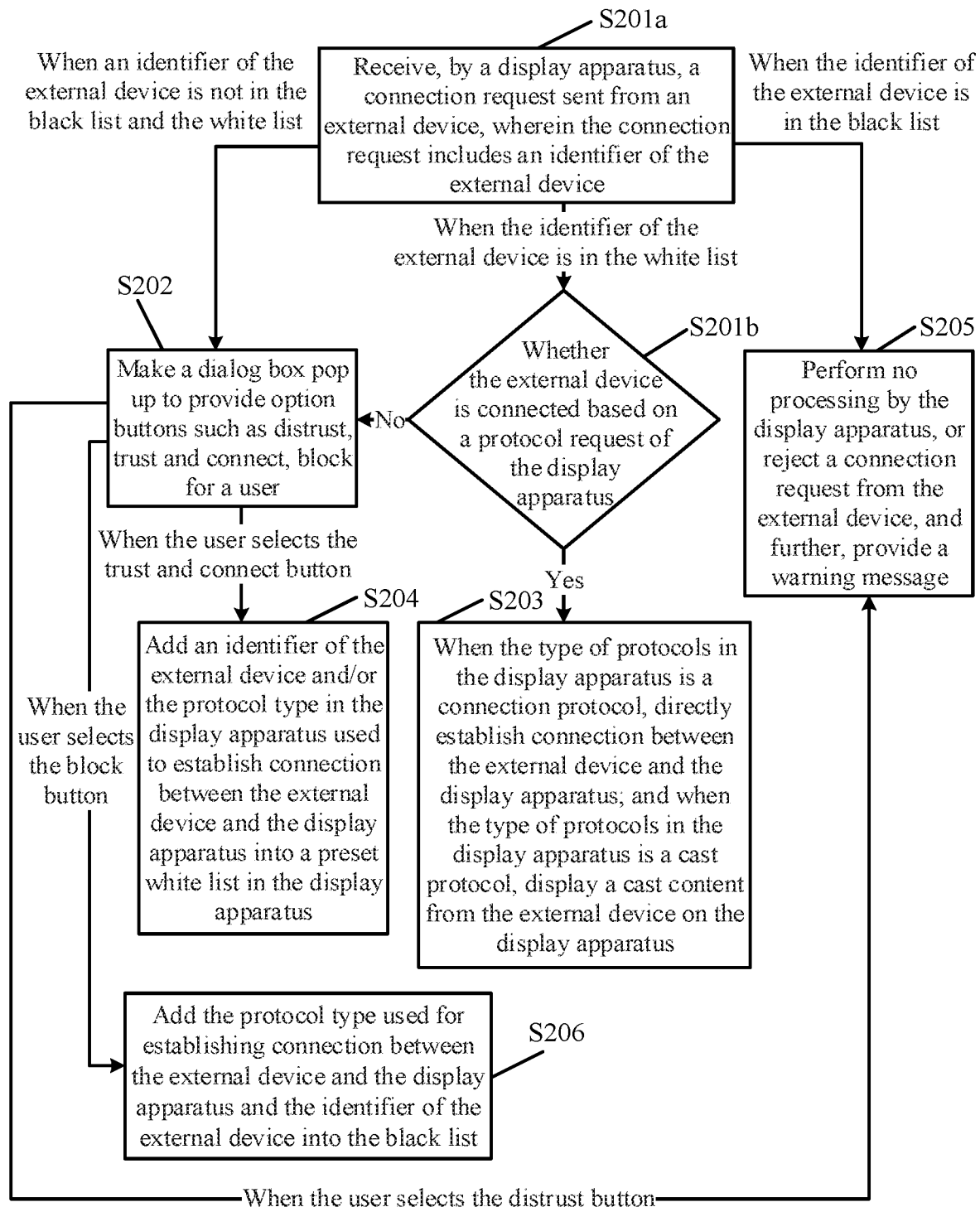
FIG. 18 is a schematic diagram of a processing process for establishing a connection between a mobile phone and a smart television according to an embodiment of the disclosure.

Referring to FIG. 18, an implementation process according to the embodiment of the disclosure, for example, includes the following.

Step S201a, a display apparatus receives a connection request sent from an external device, wherein the connection request includes an identifier of the external device, and the display apparatus detects whether the identifier is in the black list or the white list preset in the display apparatus. When the identifier is neither in the black list nor the white list, step S202 is executed. Otherwise, when the identifier of the external device is in the white list preset in the display apparatus, step S201b is executed. That is, whether the external device is connected based on a protocol request of the display apparatus is determined. If not, step S202 is executed, and if yes, step S203 is executed. When the identifier of the external device is in the black list preset in the display apparatus, step S205 is executed.

The type of protocols in the display apparatus includes: a cast protocol, e.g., DLNA, Miracast, Airplay, etc.; and a connection protocol: a private protocol. According to the specifications of the protocols in the display apparatus, such as the cast protocol and the connection protocol, the display apparatus may send or broadcast a protocol request to one or more external devices, and the external devices may respond to the protocol request received to establish a connection with the display apparatus according to the specific requirements of that protocol.

Figure 19:
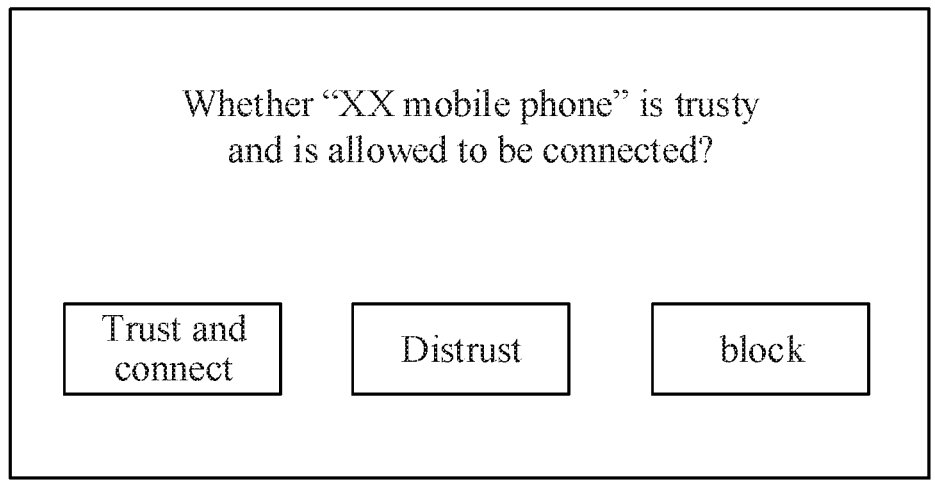
FIG. 19 is a schematic diagram of a user interface for providing option buttons of distrust, trust and connect, and block for a user according to an embodiment of the disclosure.
Figure 20:
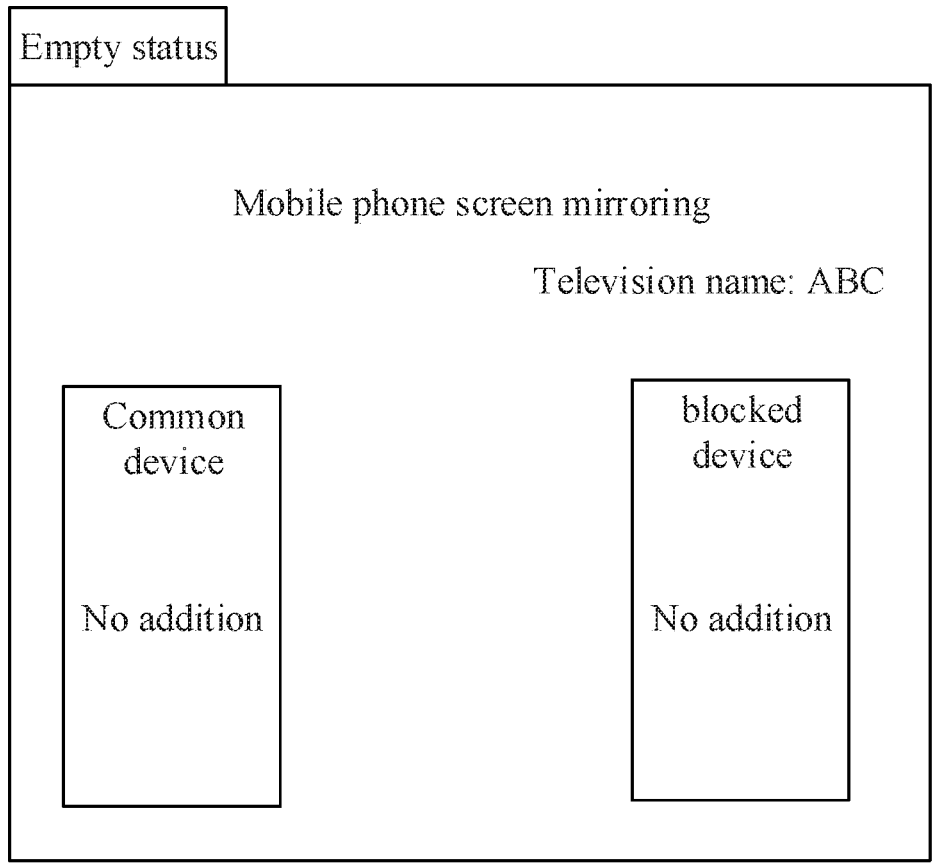
FIG. 20 is a schematic diagram of a management interface for a black list and a white list presented to a user when a black list and a white list in a television are empty according to an embodiment of the disclosure.

Step S202, the display apparatus pops up a dialog box to provide option buttons such as distrust, trust and connect, block, e.g., a user interface shown in FIG. 19.

When the user selects the trust and connect button, step S204 is executed; when the user selects the distrust button, step S205 is executed; and if the user selects the block button, step S206 is executed.

Step S203, when the type of protocols in the display apparatus is a connection protocol, connection between the external device and the display apparatus is directly established; and when the type of protocols in the display apparatus is a cast protocol, a content cast from the external device is displayed on the display apparatus.

Step S204, when an identifier of the external device is not in the white list, the identifier of the external device is added into the white list preset in the display apparatus, and the protocol type (cast protocol or private protocol) in the display apparatus used to establish connection between the external device and the display apparatus is also added into the preset white list in the display apparatus.

When the identifier of the external device is in the white list, the protocol type (cast protocol or private protocol) in the display apparatus which is used to establish connection between the external device and the display apparatus is also added into the preset white list in the display apparatus.

When the protocol for establishing connection between the external device and the display apparatus is the connection protocol, connection between the external device and the display apparatus is directly established, and when the protocol for establishing connection between the external device and the display apparatus is a cast protocol, the content cast from the external device is displayed on the display apparatus.

Step S205, the display apparatus does not perform any processing, or rejects a connection request from the external device, and may further provide a warning message.

Step S206, the protocol type used for establishing connection between the external device and the display apparatus and the identifier of the external device are added into the black list.

Besides, the user may also open the management interface of the black list and the white list in the setting menu of the display apparatus, and may call the black list and the White list to maintain and manage them. For example, the identifier of the device and the protocol added into the black list or the white list can be deleted via the setting menu. When the device requests to connect with the display apparatus again next time after being deleted, the above first step is executed repeatedly.

For example, if the black list and the white list in the display apparatus are empty, the management interface of the black list and the white list presented to the blocked device is in the black list.

Figure 21:
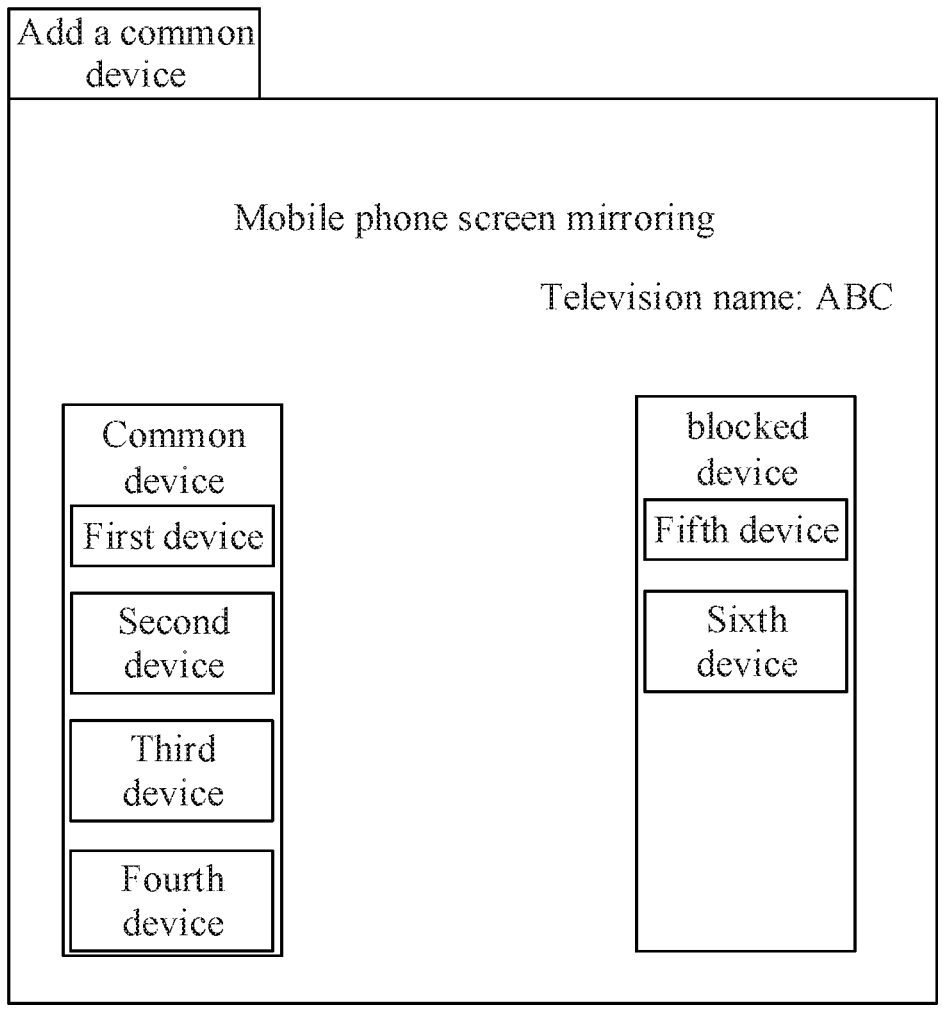
FIG. 21 is a schematic diagram of a management interface of a black list and a white list presented to a user when a user needs to add a commonly used device according to an embodiment of the disclosure.

When the user needs to add a commonly used device, a management interface of the black list and the white list presented to the user is shown in FIG. 21 for example, an identifier of a new device, e.g., the first device, may be added into the commonly used device, other related contents, e.g., the protocol, etc., may be also added.

Figure 22:
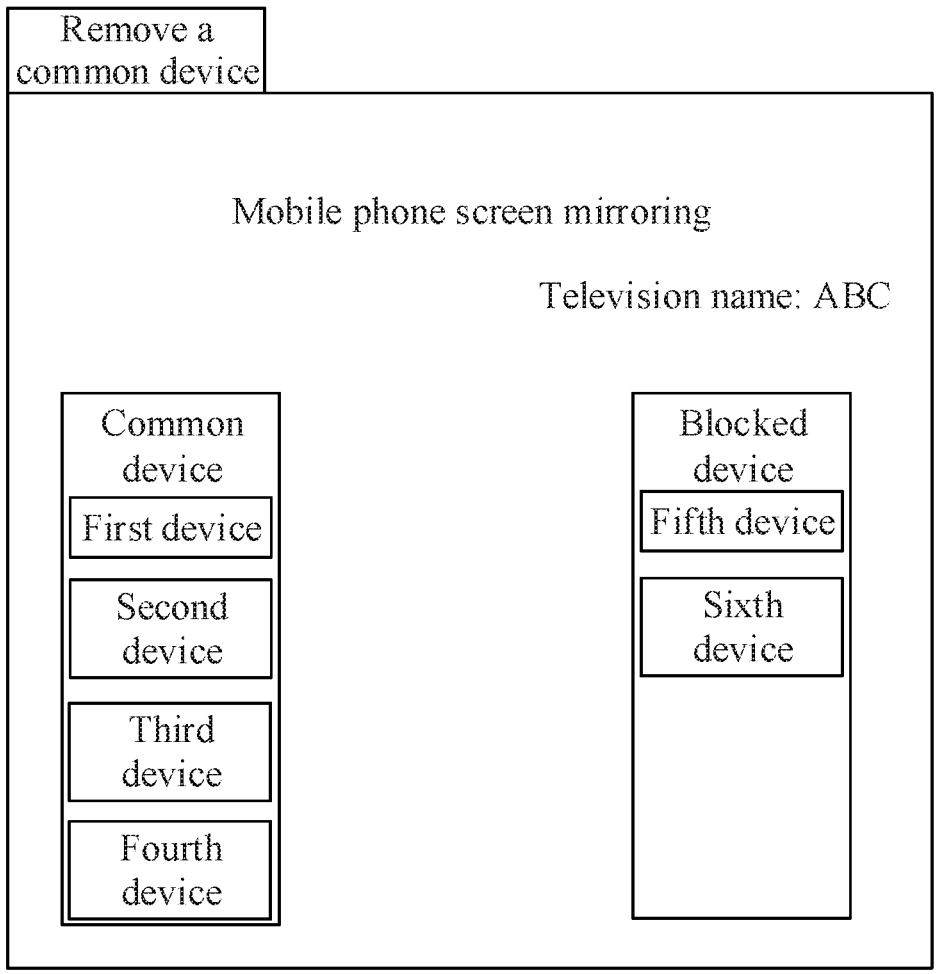
FIG. 22 is a schematic diagram of a management interface of a black list and a white list presented to a user when the user needs to remove a commonly used device according to an embodiment of the disclosure.
Figure 23:
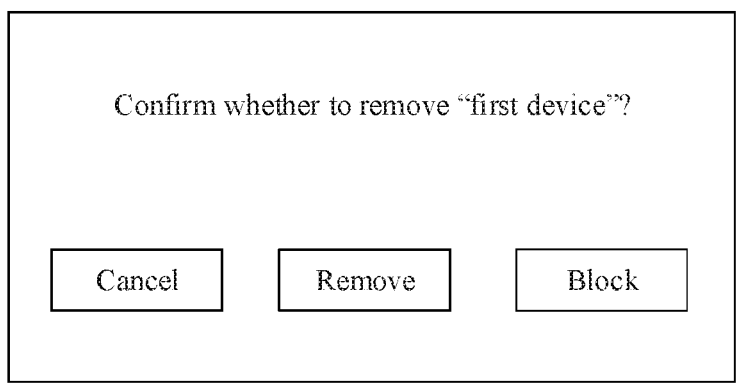
FIG. 23 is a schematic diagram of a prompt interface presented to a user when an identifier of a device is removed from the commonly used device according to an embodiment of the disclosure.

When the user needs to remove from the commonly used device, a management interface of the black list and the white list presented to the user is shown in FIG. 22, and the identifier of the device may be removed from the commonly used device. For example, the first device is to be removed. A prompt interface as shown in FIG. 23 is further presented to the user to determine whether to remove the first device through selection. There may be three option buttons: cancel, remove, block on the prompt interface. When the user select the "cancel", the operation removing the first device this time is canceled; When the user select the "remove", it is determined that the first device is removed from a common device list; and when the user selects the "block", the identifier of the first device is added into a blocked device list, that is, transferred from the white list to the black list. Certainly, the user may also remove other related contents, for example, the protocol and the like.

Figure 24:
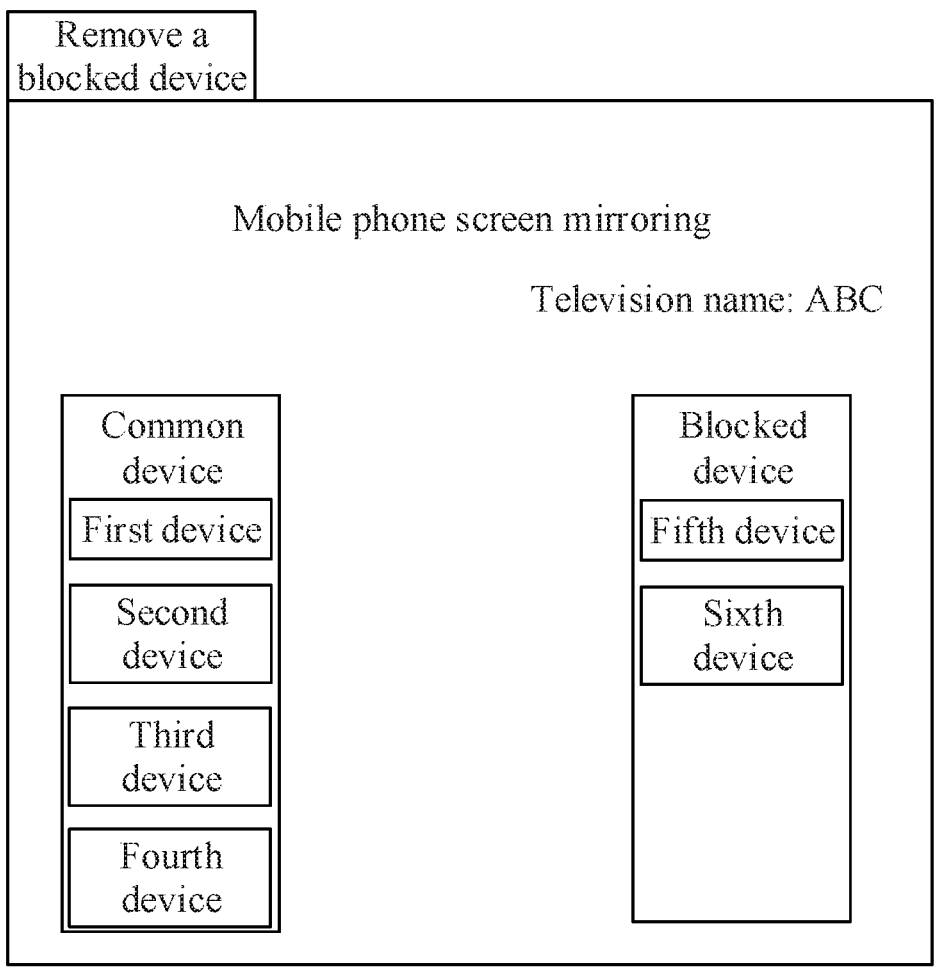
FIG. 24 is a schematic diagram of a management interface of a black list and a white list presented to a user when the user needs to remove a blocked device according to an embodiment of the disclosure.
Figure 25:
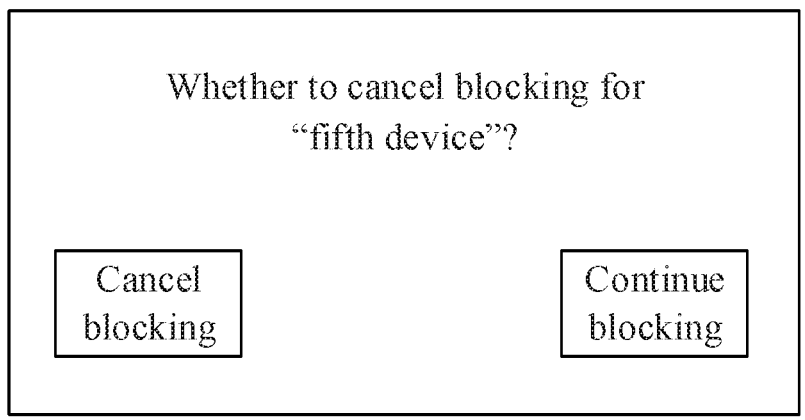
FIG. 25 is a schematic diagram of a prompt interface presented to a user when an identifier of a device is removed from the blocked device according to an embodiment of the disclosure.

Likewise, when the user needs to remove a blocked device, a management interface of the black list and the white list presented to the user is shown in FIG. 24. An identifier of a device may be removed from the blocked device. For example, the fifth device is to be removed. A prompt interface as shown in FIG. 25 is further presented to the user to determine whether to cancel the blocking for the fifth device through selection. There may be two option buttons: cancel blocking and continue blocking on the prompt interface. When the user selects the "cancel blocking", it is determined that the fifth device is removed from the blocked device list; and when the user selects the "continue blocking", the operation of removing the fifth device this time is canceled. Certainly, the user may also remove other related contents, for example, the protocol, etc.

Figure 26:
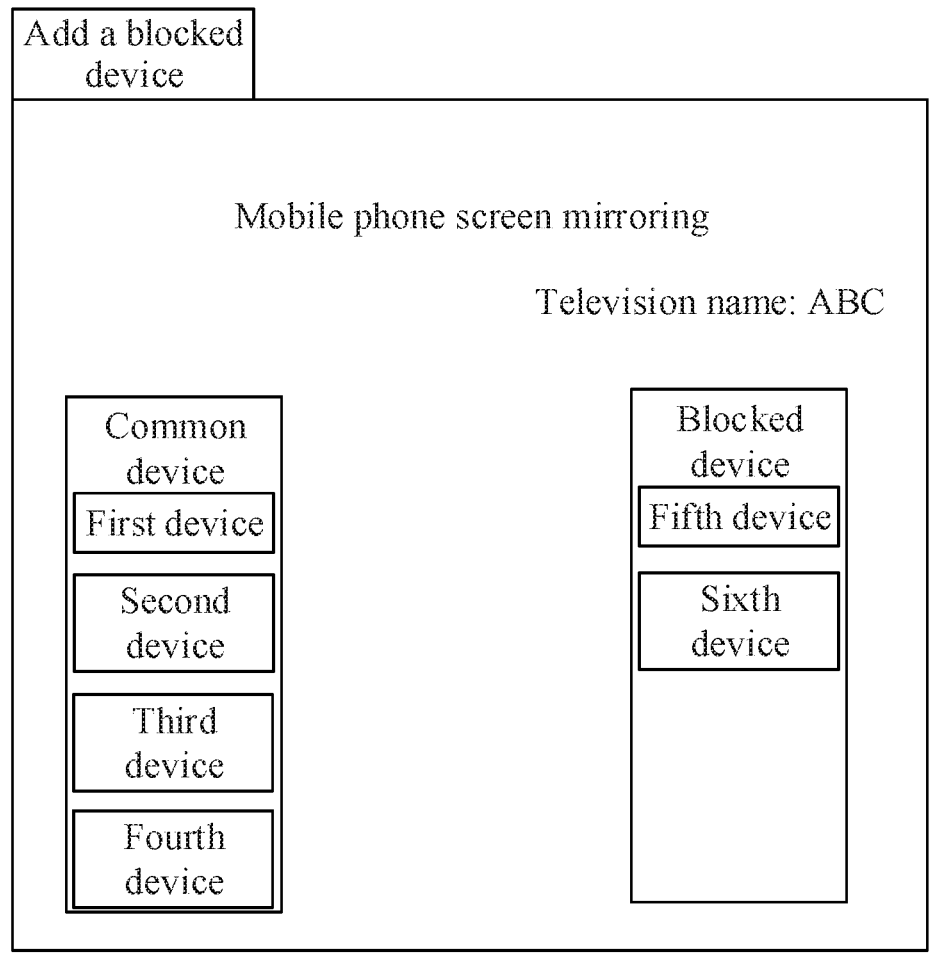
FIG. 26 is schematic diagram of a management interface of a black list and a white list presented to a user when the user is allowed to add a blocked device according to an embodiment of the disclosure.

Likewise, the user may also add the blocked device, the management interface of the black list and the white list presented to the user is shown in FIG. 26 for example. The user may add an identifier of a new device in the blocked device list. For example, when the user selects the block button shown in FIG. 19 and selects the block button shown in FIG. 23, the interface shown in FIG. 26 may be presented, and the identifier of the blocked device to be added which is determined by the user is added into the blocked device list. Certainly, other related contents may be also added in the blocked device list, for example, the protocol, etc.

Figure 27:
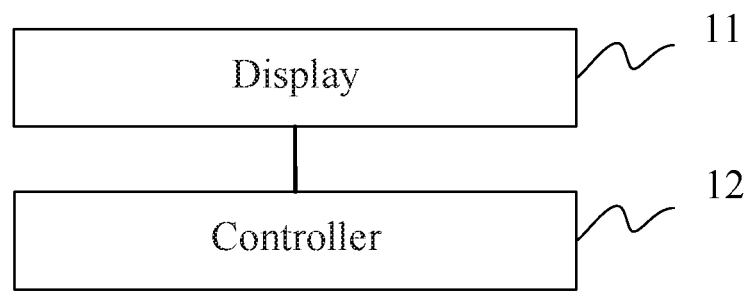
FIG. 27 is a schematic structural diagram of a display apparatus according to an embodiment of the disclosure.

Referring to FIG. 27, a display apparatus according to an embodiment of the disclosure includes a display 11 and a controller 12.

The display 11 is configured to display a user interface and a content cast from an external device in connection with the display apparatus.

The controller 12 is in communication with the display, and is configured to execute the following flow to cause the display 11 to show the user interface and the content from the external device in connection with the display apparatus, etc.

When a connection request from the external device is received, an identifier of the external device is obtained from the connection request, for example, the identifier of the external device carried in the received connection request from the external device is "first device".

Whether the identifier of the external device carried in the connection request is included in the black list or the white list is determined, and whether connection between the display apparatus and the external device is established is determined according to the above determination result. The white list includes the identifier of the external device which allows for establishing connection with the display apparatus, and the black list includes an identifier of the external device which does not allow for establishing connection with the display apparatus.

When the display apparatus receives the connection request from the external device, whether the identifier of the external device carded in the connection request is included in the black list or the white list is determined, and whether connection between the display apparatus and the external device is established is determined according to a the determination result, so that safety of multiple parties interaction is improved, and connection established between an illegal device and a smart display apparatus is avoided.

In some embodiments of the disclosure, when the identifier of the external device is neither included in the black list nor in the white list, the controller 12 is further configured to control the display to present a user interface (e.g., an interface shown in FIG. 19, wherein "XX mobile phone" is an identifier of the external device requesting to establish connection) including option buttons of distrust, trust and connect, and block.

When the user selects the trust and connect button, the identifier of the external device is added into the white list. Besides, when the protocol used for establishing connection between the external device and the display apparatus is the connection protocol, connection between the external device and the display apparatus is directly established; and when the protocol used for establishing connection between the external device and the display apparatus is the cast protocol, the display 11 is controlled to display the content cast from the external device.

When the user selects the distrust button, the display apparatus is controlled not to establish connection with the external device, for example, the above step S205 is executed.

When the user selects the block button, the identifier of the external device is added into the black list.

In some embodiments of the disclosure, while the identifier of the external device is added into the white list, the controller 12 further adds the protocol adopted for establishing connection between the external device and the display apparatus into the white list.

In some embodiments of the disclosure, while the identifier of the external device is added into the black list, the controller 12 further adds the protocol adopted for establishing connection between the external device and the display apparatus into the black list.

In some embodiments of the disclosure, when the identifier of the external device is in the white list and the external device request to establish connection according a protocol in the display apparatus, then: the controller controls to directly establish connection between the external device and the display apparatus, when the protocol adopted for establishing connection between the external device and the display apparatus is the connection protocol; and the controller controls the display to display the content from the external device when the protocol used for establishing connection between the external device and the display apparatus is the cast protocol.

In some embodiments of the disclosure, when the identifier of the external device is in the white list, and the external device requests to establish connection not through the protocol, the controller 12 is further configured to: control the display to present the user interface (e.g., interface shown in FIG. 19, wherein "XX mobile phone" is the identifier of the external device requesting to establish connection including the option buttons: distrust, trust and connect, and block.

When the user selects the trust and connect button, the identifier of the external device is added into the white list. Besides, if the protocol adopted for establishing connection between the external device and the display apparatus is the connection protocol, connection between the external device and the display apparatus is directly established; and when the protocol adopted for establishing connection between the external device and the display apparatus is the cast protocol, the display is controlled to display the content cast from the external device.

When the user selects the distrust button, the display apparatus is controlled not to establish connection with the external device.

When the user selects the block button, the identifier of the external device is added into the black list.

In some embodiments of the disclosure, when the identifier of the external device is in the black list, the controller 12 controls the display apparatus not to establish connection with the external device.

In some embodiments of the disclosure, the controller 12 is further configured to: control the display to present the management interface (for example, the interface shown in FIGS. 20 to 26) of the black list and the white list in the display apparatus to realize editing management for the black list and/or the white list for the user through the management interface. For example, operations of deleting and adding the identifier of the external device in the black list and/or the white list can refer to the above description.

Figure 28:
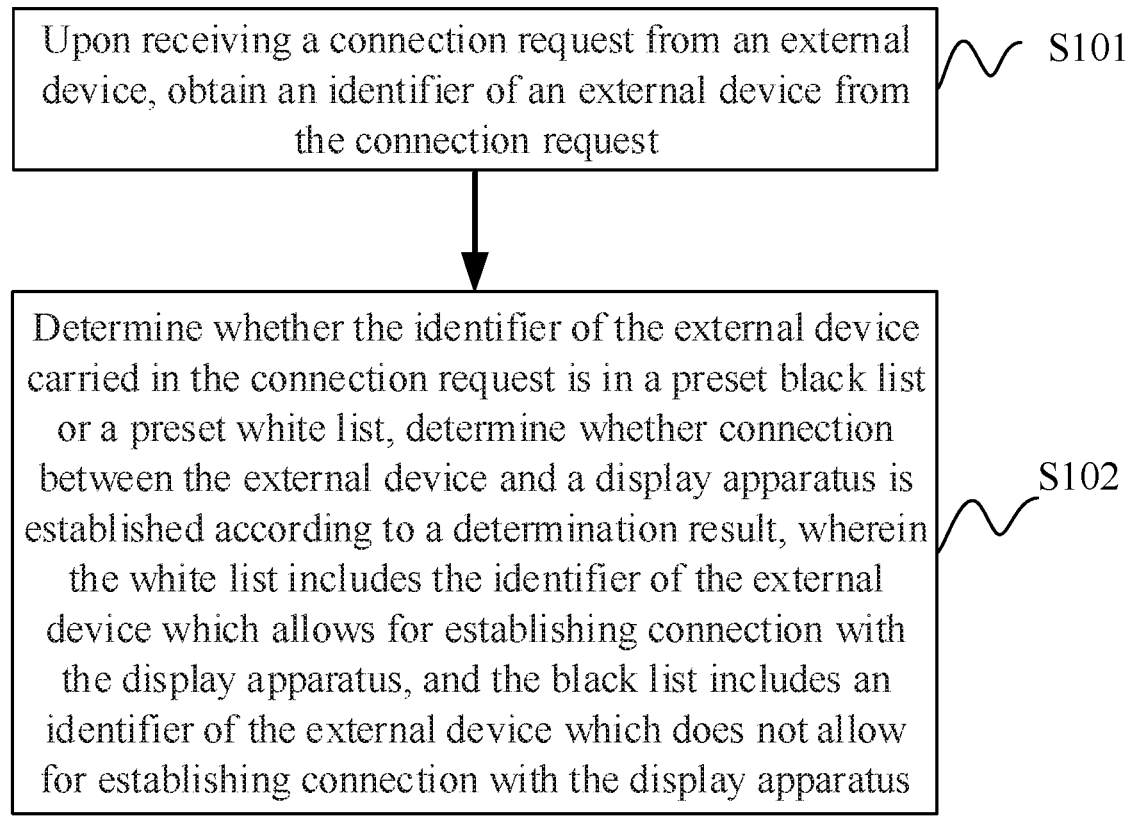
FIG. 28 is a schematic flowchart of a control method for establishing connection with a display apparatus according to an embodiment of the disclosure.

Referring to FIG. 28, a control method for establishing connection with the display apparatus according to an embodiment of the disclosure includes the following.

S101, upon receiving a connection request front an external device, an identifier of an external device is obtained from the connection request.

S102, whether the identifier of the external device carried in the connection request is in a preset black list or a preset white list is determined, and whether connection between the external device and the display apparatus is established is determined according to the above determination result.

The white list includes the identifier of the external device which allows for establishing connection with the display apparatus, and the black list includes an identifier of the external device which does not allow for establishing connection with the display apparatus.

Determining whether connection between the external device and the display apparatus is established according to the determination result may refer to a flow shown in FIG. 2.

Identifiers of devices in all connection modes are classified and saved in the display apparatus, which are classified in the white list and the black list and may be managed. A device such as a mobile phone in the white list is allowed to be connected with the display apparatus and its operation command is responded. A device in the black list is directly blocked during a connection phase and the user will not be aware. When the device is not in the white list and the black list, a dialog box will pop up during connection every time to make the user select block, distrust, or trust and connect. Accordingly, safety of multiple parties interaction may be greatly improved.

Figure 29:
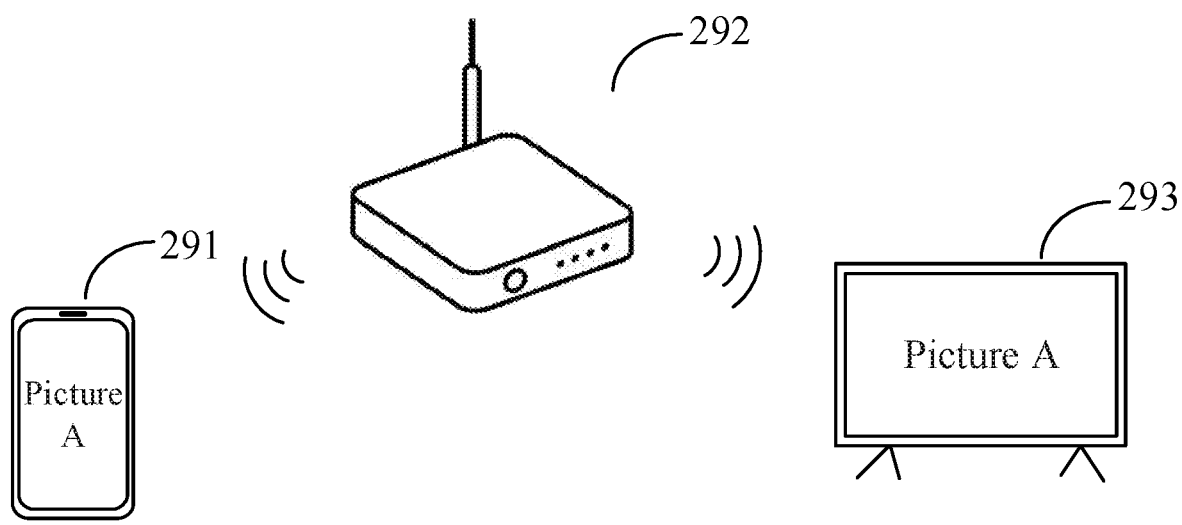
FIG. 29 is a schematic structural diagram of a cast system according to an embodiment of the disclosure.

The cast method according to the embodiment of the disclosure may be applied to a cast system shown in FIG. 29. As shown in FIG. 29, the cast system includes: a first device 291, a network access device 292 and a second device 293. The first device 291 and the second device 293 may be a mobile phone, a pad, a computer, a display apparatus and other devices, and the network access device 292 may be a router.

In some embodiments of the disclosure, the first device 291 may be a mobile phone, the network access device 292 may be the router, and the second device 293 may be the display apparatus. In an embodiment, the router may serve as an access point (AP) to establish local area network, and the mobile phone and the display apparatus are located in the local area network. In some scenarios, a screen of the mobile phone is small, so it is inconvenient to watch a video. Some users want to cast some pictures, videos and other multimedia data in the mobile phone onto the display apparatus, and current cast is mainly based on a DLNA protocol. For example, the user opens a certain video resource in video software such as XY video and wants to cast the video resource onto the display apparatus for view. A screen cast request may be initiated by clicking a cast button in the video software. In this case, clicking the cast button is equivalent to sending a device discovery request. The device discovery request firstly reaches the router, the router searches for other devices located in the above local area network, and a search result is fed back to the video software for the user. The above process needs participation of the router, so there is packet loss in the router, the chance of discovering a device is low. If the router is set to be AP isolation, a device may not be discovered, so the display apparatus may not be searched, that is, the display apparatus cannot be discovered. Therefore, DLNA cast cannot be realized, and user experience is affected.

Figure 30:
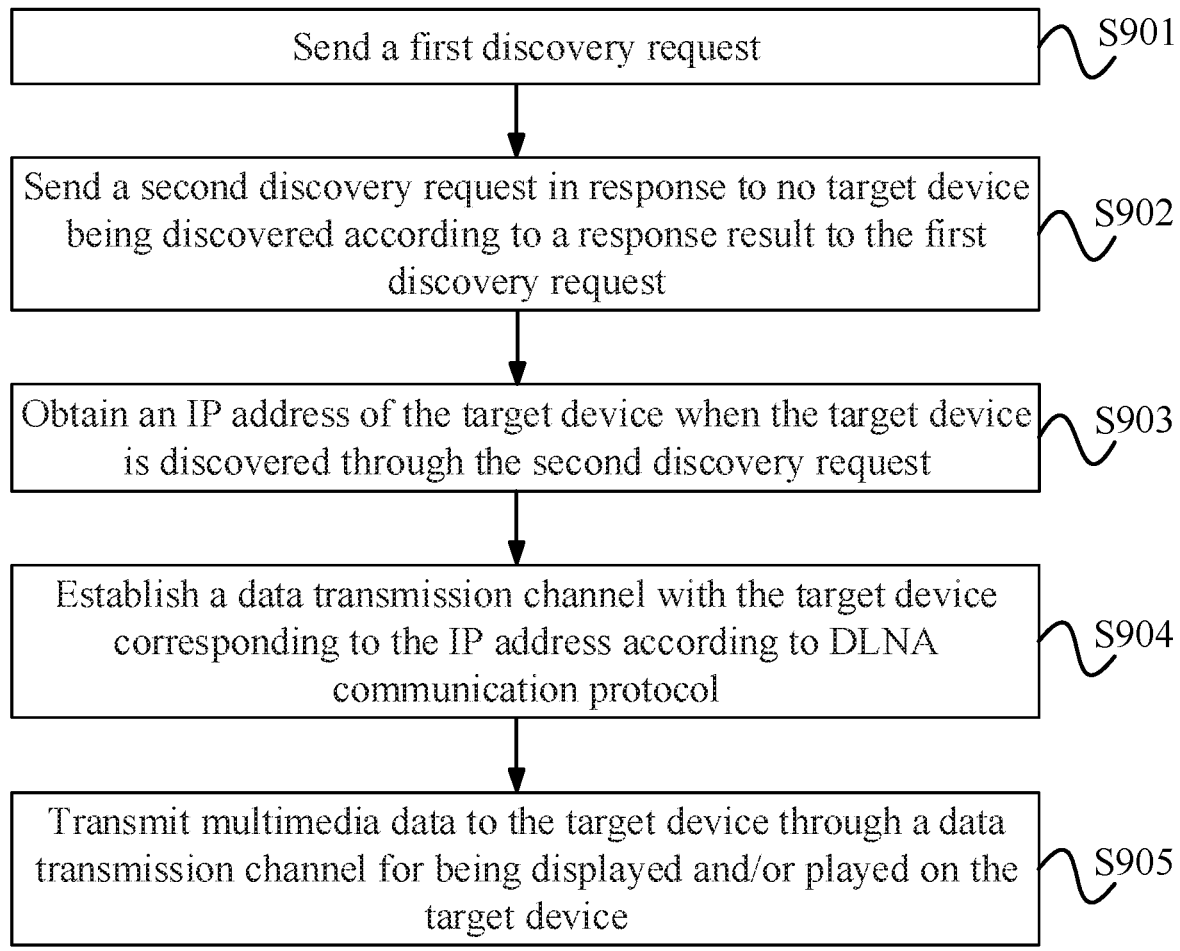
FIG. 30 is a flowchart of a cast method according to an embodiment of the disclosure.

FIG. 30 is a flowchart of a cast method according to an embodiment of the disclosure. The embodiment of the disclosure provides the cast method as follows.

Step 901, a first discovery request is sent.

The first discovery request is generated according DLNA (Digital Living Network Alliance) protocol. The method may be implemented in a device, e.g., a mobile phone. During the DLNA cast process, the device, serving as a control point, may send the first discovery request via multicast.

In an example where the mobile phone and the display apparatus are involved, the first discovery request may be sent according to information of operation on the mobile phone from a user, for example, the user opens video application and clicks a cast button or menu in the video application so as to cause the device send the first discovery request, then the first discovery request is sent to the router in the local area network wherein the mobile phone is located.

In the embodiment, the first discovery request is sent in a mode not limited to the above cast button, or may be sent through other preset gesture operations, or operation to the device itself, e.g., a force applied to the device. For example, a rotation or other operations changes a motion state of the device, thus the first discovery request is initiated.

Step 902, a second discovery request is sent in response to no target device being discovered according to a response result to the first discovery request.

The second discovery request adopts Peer to Peer (P2P) protocol. The second discovery request includes a WIFI direct connection request.

In the embodiment, after the above first discovery request is sent to the router, the router sends the first discovery request to other devices in the above local area network. After receiving the first discovery request, the other devices reply to the device with an acknowledgement message and reply to the device with information such as a description file of a digital media renderer (DMR). When the device does not receive any acknowledgement message or the device determines that no target device is discovered according to the received acknowledgement message and reply message with the DMR description file, it is automatically switched to the P2P protocol, that is, the second discovery request is sent according to P2P protocol.

It is noted that the device sending the discovery request and the target device can be connected in the same WIFI network or via a router. In some embodiments, the device and target device are not connected via a router, or in the same WIFI network. In this case, the acknowledgement message may not be received, so a P2P based request are needed to initiate a second round of device discovery.

In some embodiments of the disclosure, sending the second discovery request when it is determined that no target device is discovered according to the response result to the first discovery request, includes: the second discovery request is sent when no acknowledgement message for a multicast search message is received within a preset time period. For example, after the multicast search message is sent by an operation of the cast button on the mobile phone from a user, the router sends the multicast search message to other devices in the local area network; and after the other devices receive the multicast search message, a message for confirming that the multicast search message is received (an acknowledgement message) may be returned to the mobile phone. When the mobile phone does not receive any acknowledgement message after waiting for T1 time duration, it is determined that discovery fails.

In some embodiments of the disclosure, sending the second discovery request when it is determined that no target device is discovered according to the response result to the first discovery request, includes: the first discovery request is resent when no acknowledgement message for the multicast search message is received; and the second discovery request is sent when the number of times the acknowledgement message for the multicast search message is not received exceeds a preset number of times. Based on the above example, the router sends the multicast search message to the other devices in the local area network, and the other devices reply a message for confirming that the multicast search message is received (an acknowledgement message) to the mobile phone after receiving the multicast search message this process usually consumes T2 time period. When the mobile phone, after waiting for the T2 time period, does not receive any acknowledgement message, the multicast search message is resent. The sending times of the multicast search message is recorded. When the multicast search message is continuously sent for three times and the acknowledgement message is not received, it is determined that discovery fails.

Step 903, an IP address of the target device is obtained when the target device is discovered through the second discovery request.

In some embodiments of the disclosure, obtaining the IP address of the target device when the target device is discovered through the second discovery request includes the following.

Step a1, a reply message to the second discovery request is received, wherein the reply message includes a mac address and/or device name of the discovered device.

Step a2, the mac address and/or device name of the target device are/is determined based on the reply message.

Step a3, P2P connection request is sent to the target device according to the mac address and/or device name of the target device.

Step a4, a TCP connection request sent from the target device is received when it is determined that the device functions as a server and the target device functions as a client, wherein the TCP connection request carries the IP address of the target device.

Step a5, the TCP connection request is parsed to obtain the IP address of the target device.

Figure 31:
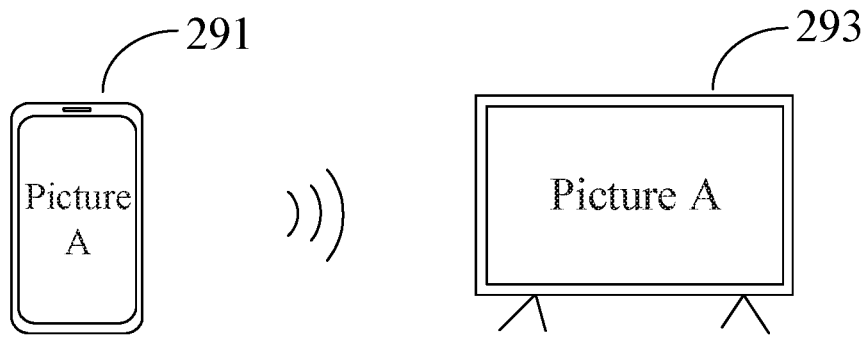
FIG. 31 is a schematic diagram of a peer-to-peer device discovery according to an embodiment of the disclosure.

Taking WIFI direct connection request as an example of the second discovery request, as shown in FIG. 31, obtaining IP address of the target device when the target device is discovered through the second discovery request includes the following. The device initiates the WIFI direct connection request. Another device (other device(s) for short below), receives the WIFI direct connection request, and replies its own device name and MAC information to the device. The device initiates a request for establishing connection to said other device according to the device name and the MAC information. The other device, after receiving the request for establishing connection, conducts negotiations with the device for establishing connection. The negotiation content includes determining which device serves as a client (group client) and which device serves as a server (group owner). After the device is determined as the group owner, the group owner device has not known its own IP address, so the group owner device will create a TCP server (TCPserver), which allows the group client device to determine an IP address of the group client device. A TCP connection request is sent to the group owner from the group client. The group owner, after receiving the TCP connection request, parses the IP address of the group client, and returns the IP address of the group client and an IP address of the group owner to the group owner according to TCP communication.

For example, the mobile terminal initiates a request according to WIFI direct protocol. When the display apparatus receives the request according to WIFI direct protocol, the display apparatus replies a device name and MAC information of the display apparatus to the mobile terminal. The mobile terminal initiates a request for establishing connection with the display apparatus according to the device name and the MAC information of the display apparatus. The display apparatus, after receiving the request for establishing connection, negotiates with the mobile terminal. When the negotiation result is that the display apparatus serves as the group client and the mobile terminal serves as the group owner, the mobile terminal creates a TCP server, and receives the TCP connection request sent from the display apparatus. The mobile terminal, after receiving the TCP connection request, parses the IP address of the display apparatus from the TCP connection request, and sends the IP address of the display apparatus and the IP address of the mobile terminal to the display apparatus in according to TCP communication manner.

In some embodiments of the disclosure, after the above step a3, the method in the embodiment further includes: step a6, the IP address of the target device is obtained when it is determined that the device is the group client and the target device is the group owner.

When the negotiation result is that the display apparatus serves as the group owner, and the mobile phone serves as the group client, both the display apparatus and the mobile phone known the IP address of the display apparatus, and both the mobile phone and the display apparatus may directly obtain the IP address of the display apparatus.

In some embodiments of the disclosure, after the IP address of the target device is obtained, the method further includes: the IP address of the target device is sent, by the device, to the target device so as to cause the target device to initiate DLNA service according to DLNA communication protocol and the IP address of the target device. For example, the mobile terminal serves as the group owner, and the display apparatus serves as the group client. The mobile terminal sends the IP address of the display apparatus to the display apparatus. The display apparatus initiates DLNA service according to DLNA protocol, and thus then establishes a data transmission channel with the mobile terminal via unicast. For another example, the display apparatus directly obtains its own IP address when the mobile phone serves as the group client and the display apparatus serves as the group owner, and then initiates DLNA service according to DLNA protocol and IP address of the group client device, so as to establish a data transmission channel with the mobile terminal via unicast.

Step 904, a data transmission channel is established with the target device corresponding to the IP address according to DLNA communication protocol.

In sonic embodiments of the disclosure, establishing a data transmission channel with the target device corresponding to the IP address according to DLNA communication protocol, includes the following. A unicast message is sent to the target device corresponding to the IP address. Address information of the description file returned from the target device is received. A description file is obtained from an address corresponding to the address information of the description file. The description file includes description information of the target device. The description information of the target device is stored in a device list.

For example, the mobile phone, after receiving the IP address of the television, may initiates a connection request according to DLNA protocol via unicast so as to establish a data transmission channel between the mobile terminal and display apparatus. The mobile terminal sends a unicast message to the display apparatus corresponding to the IP address. The display apparatus, after receiving the unicast message, may return address information of the DMR description file, then the mobile terminal requests the display apparatus for obtaining DMR description file according to the address information of the DMR description file. The display apparatus replies the DMR description file to the mobile terminal. The mobile terminal may obtain more detailed device description information, for example, the universally unique identifier (UUID) of the display apparatus and device type information according to DLNA protocol, and then the mobile terminal saves all obtained information of the display apparatus in the device list. So, the data transmission channel completes establishment.

Step 905, the multimedia data are transmitted to the target device through the data transmission channel for being displayed and/or played on the target device.

In some embodiments of the disclosure, transmitting the multimedia data to the target device through the data transmission channel for being displayed and/or played on the target device includes the following. According to an operation of selecting the multimedia data for cast, to-be-cast multimedia data are determined. A link is formed according to the to-be-cast multimedia data. The link is sent to the target device to cause the target device to parse a file address according to the link, to obtain a corresponding file according to the file address, and to deliver the obtained file to a player of the target device for playback.

For example, after the data transmission channel is established, the user may select and pictures, videos or the other multimedia data in the mobile phone and issue a command for casting them to the display apparatus. The display apparatus, after receiving cast content, parses the address of the file, obtains the corresponding file according to the address of the file, and distributes the obtained file to its player for playback.

In the embodiments of the disclosure, the first discovery request is sent from according to DLNA communication protocol; the second discovery request is sent when it is determined that no target device is discovered according to the response result to the first discovery request, and the second discovery request adopts peer-to-peer communication protocol. The IP address of the target device is obtained when the target device is discovered through the second discovery request. The data transmission channel is established with the target device corresponding to the IP address according to DLNA communication protocol. The multimedia data are transmitted to the target device through the data transmission channel for being displayed and/or played on the target device. In the device discovery process, when no target device is discovered, it is switched to the peer-to-peer communication protocol to discover a target device, since the peer-to-peer communication protocol is a decentralized direct connection communication and does not need a central party for relaying. Therefore, for situations where possibility of device discovery is low due to packet loss of the router or the device cannot be discovered due to AP isolation set in the router, the target device may be discovered via bypassing the router. Furthermore, after the IP address of the target device is obtained in an peer-to-peer communication mode, a data transmission channel is established with the target device according to DLNA protocol, then the multimedia data to be cast are transmitted to the target device through the data transmission channel and then are being displayed and/or played through the player and/or a display of the target device, so content cast based on DLNA may be realized.

Taking a mobile phone and a television as an example below, the cast method in the embodiment of the disclosure is described in detail.

Figure 32:
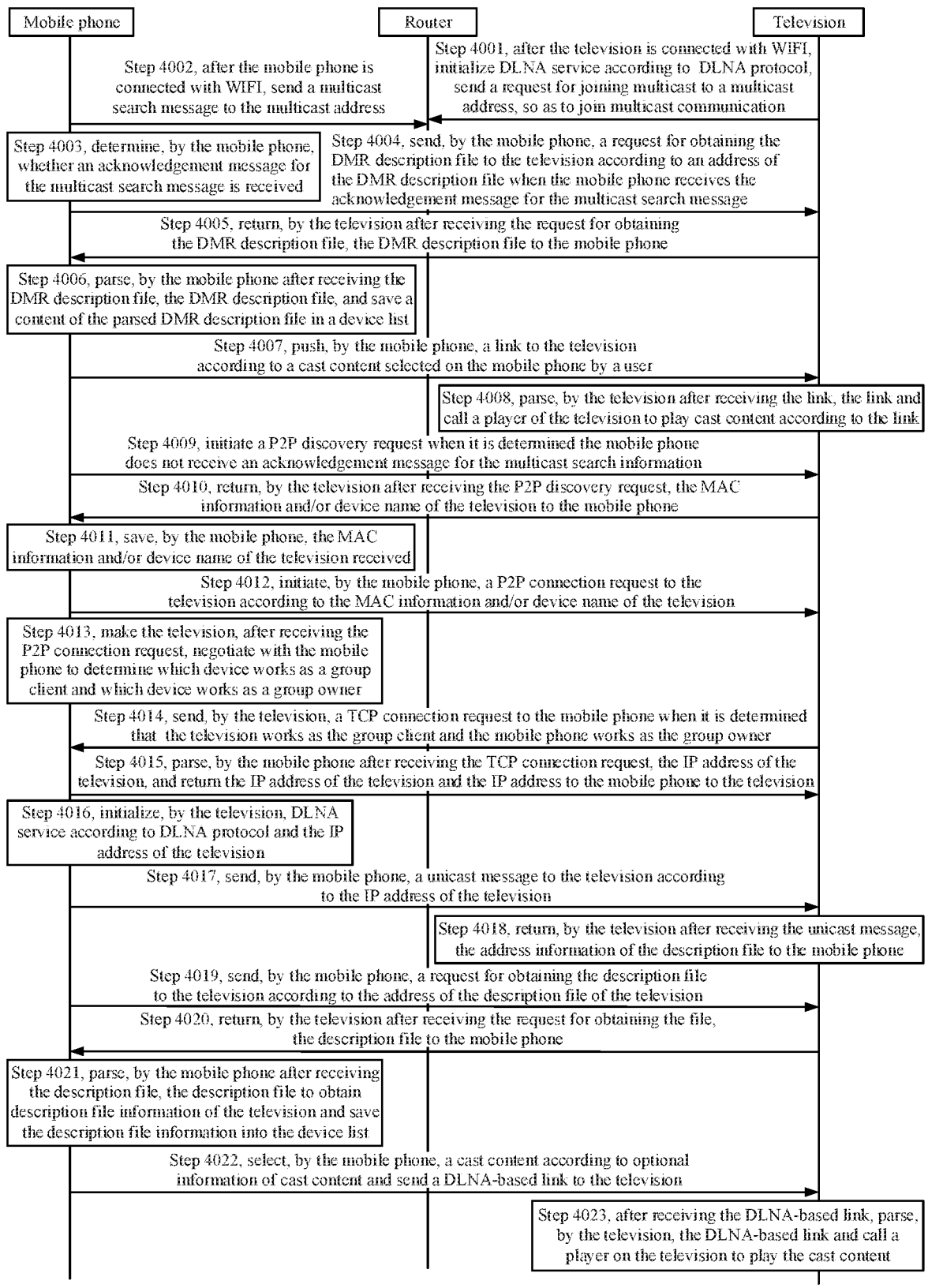
FIG. 32 is a signaling diagram of a cast method according to an embodiment of the disclosure.

FIG. 32 is a flowchart of a cast method according to an embodiment of the disclosure. A shown in FIG. 32, the cast method according to an embodiment specifically includes the following steps.

Step 4001, after the television is connected with WIFI, the television initiates DLNA service according to DLNA protocol, sends a request for joining multicast to a multicast address, for example, an address 239.255.255.250, so as to join multicast communication.

Step 4002, after the mobile phone is connected with WIFI, the mobile phone sends a multicast search message to the multicast address.

For example, the mobile phone sends the multicast search message to the address 239. 255. 255. 250.

Step 4003, the mobile phone determines whether acknowledgement message for the multicast search message is received.

When the mobile phone receives the acknowledgement message for the multicast search message, it means that the television receives the multicast search message and returns the acknowledgement message to the mobile phone, and meanwhile, the television also returns an address of the DMR description file to the mobile phone.

Step 4004, the mobile phone sends a request for obtaining the DMR description file to the television according to the address of the DMR description file when the mobile phone receives the acknowledgement message for the multicast search message.

Step 4005, the television, after receiving the request for obtaining the DMR description file, returns the DMR description file to the mobile phone.

Content of the DMR description file at least includes a device name, an IP address, MAC information, QUID, DLNA device type.

Step 4006, the mobile phone, after receiving the DMR description file, parses the DMR description file, and saves the content of the parsed DMR description file in a device list.

Step 4007, the mobile phone pushes a link to the television according to cast content on the mobile phone selected by the user.

Step 4008, the television, after receiving the link, parses the link and calls a player of the television to play cast content according to the link.

Step 4009, the mobile phone initiates a P2P discovery request when it is determined the mobile phone does not receive an acknowledgement message for the multicast search information.

An implementation process of the steps may refer to the descriptions of the step 202, which is not repeated herein.

Step 4010, the television, after receiving the P2P discovery request, returns the MAC information and/or device name of the television to the mobile phone.

Step 4011, the mobile phone saves the MAC information and/or device name of the television received.

Step 4012, the mobile phone initiates a P2P connection request to the television according to the MAC information and/or device name of the television.

Step 4013, the television, after receiving the P2P connection request, negotiates with the mobile phone to determine which device works as a group client and which device works as a group owner.

Step 4014, the television sends a TCP connection request to the mobile phone when it is determined that the television works as the group client and the mobile phone works as the group owner.

When the television is the group client and the mobile phone is the group owner, the group client device (i.e., the television) does not know its own IP address in the network formed among the mobile phone and television. TCP server (tcpserver) is created by the group owner (i.e., the mobile phone), the television connects with the TCP server on its own initiative, and then the mobile phone receives the TCP connection request from the television.

Step 4015, the mobile phone, after receiving the TCP connection request, parses the IP address of the television, and returns the IP address of the television and the IP address of the mobile phone to the television.

Step 4016, the television initializes DLNA service according to DLNA protocol and the IP address of the television.

The initialization of the DLNA service on the television needs IP address of the television, and is a procedure for preparing to establish a connection between the mobile phone and the television via unicast.

Step 4017, the mobile phone sends a unicast message to the television according to the IP address of the television.

Step 4018, the television, after receiving the unicast message, returns the address information of the description file to the mobile phone.

Step 4019, the mobile phone sends a request for obtaining the description file to the television according to the address of the description file of the television.

Step 4020, the television, after receiving the request for obtaining the file, returns the description file to the mobile phone.

Step 4021, the mobile phone, after receiving the description file, parses the description file to obtain description file information of the television and saves the description file information into the device list.

The description file information of the television at least includes UUID and DLNA device type.

Step 4022, the mobile phone selects cast content according to information for selecting cast content and sends a DLNA-based link to the television.

Step 4023, the television, after receiving the DLNA-based link, parses the DLNA-based link and calls a player on the television to play the cast content.

In some embodiments of the disclosure, the mobile phone may work as a group client, and the television may work as a group owner. When the mobile phone works as a group client and the television works as a group owner, both the television and the mobile phone know the IP address of the television. The television obtains its own IP address and initializes DLNA service according to DLNA protocol by directly using the IP address of the television, then the mobile phone directly sends the unicast message to television according to the IP address of the television, and the above steps 4018 to 4023 are executed.

Figure 33:
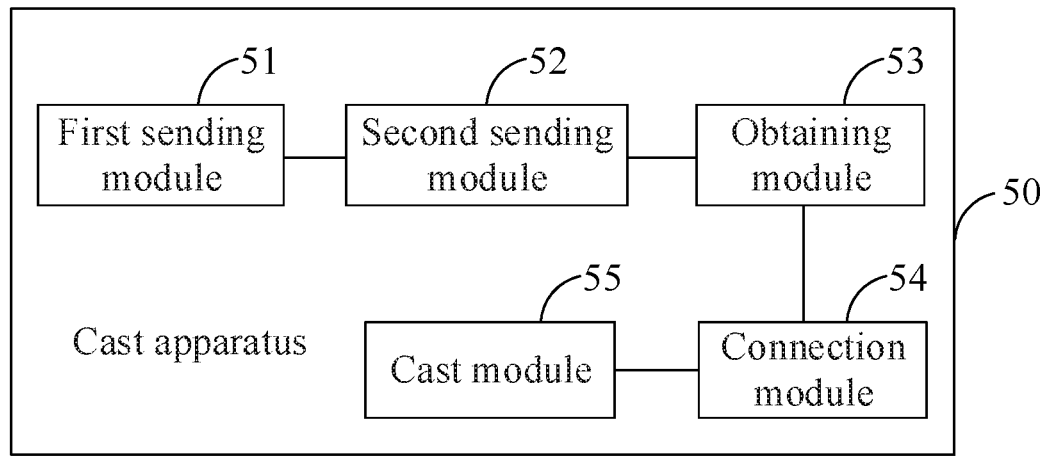
FIG. 33 is a schematic structural diagram of a cast apparatus according to an embodiment of the disclosure.

FIG. 33 is schematic structural diagram of a cast apparatus according to an embodiment of the disclosure. The cast apparatus may be a terminal device in the above embodiment. The cast apparatus according to an embodiment of the disclosure may perform the processing flow according to the embodiment of the cast method. As shown in FIG. 33, the cast apparatus 50 includes: a first sending module 51, a second sending module 52, an obtaining module 53, a connection module 54 and a cast module 55. The first sending module 51 is configured to send a first discovery request according to DLNA protocol. The second sending module 52 is configured to send a second discovery request when it is determined that no target device is discovered according to a response result to the first discovery request, and the second discovery request adopts an peer-to-peer communication protocol. The obtaining module 53 is configured to obtain an IP address of the target device when it is determined the target device is discovered through the second discovery request. The connection module 54 is configured to establish a data transmission channel with the target device corresponding to the IP address according to DLNA communication protocol. The cast module 55 is configured to transmit multimedia data to the target device through the data transmission channel so as to display and/or play the multimedia data on the target device.

Figure 34:
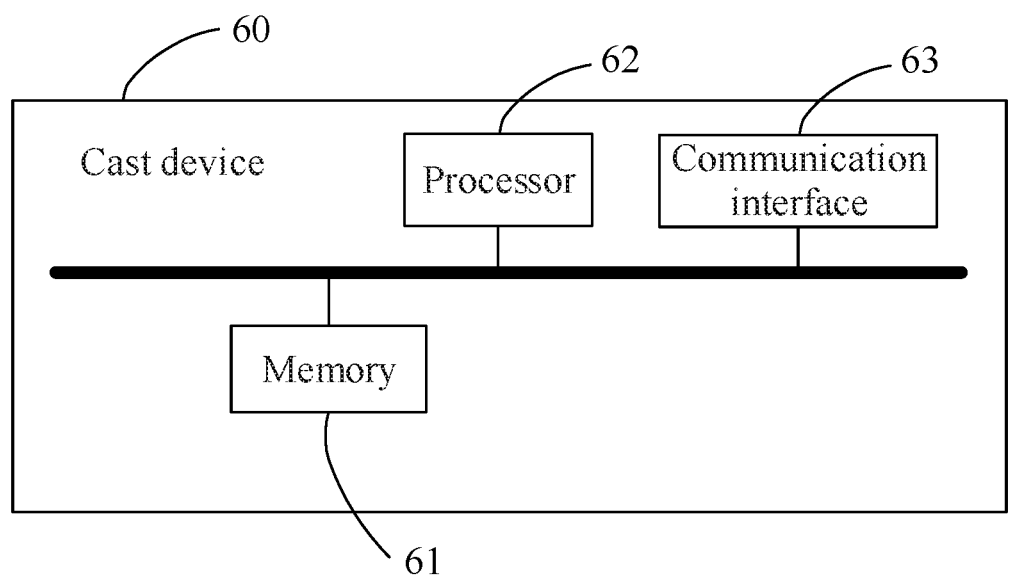
FIG. 34 is a schematic structural diagram of a cast device according to an embodiment of the disclosure.

FIG. 34 is a schematic structural diagram of a cast device according to an embodiment of the disclosure. The cast device may be the device described in the above embodiment. The cast device according to the embodiment of the disclosure may execute the processing flow according to the embodiment of the cast method. As shown in FIG. 34, the cast device 60 includes: a memory 61, a processor 62, computer programs and a communication interface 63. The computer programs are stored in the memory 61 and configured to be performed by the processor 62 for the following operations. The first discovery request is sent, wherein the first discovery request adopts DLNA communication protocol. The second discovery request is sent when it is determined that no target device is discovered according to a response result to the first discovery request, wherein the second discovery request adopts a peer-to-peer communication protocol. An IP address of the target device is obtained when it is determined that the target device is discovered through the second discovery request. A data transmission channel is established with the target device corresponding to the IP address according to DLNA communication protocol; and multimedia data are transmitted to the target device through the data transmission channel so as to display and/or play the multimedia data through the target device.

In some embodiments of the disclosure, the processor 62 obtains the IP address of the target device when the target device is discovered through the second discovery request by the following. A reply message to the second discovery request is received and the reply message includes mac address and/or device name of the discovered device. Mac address and/or device name of the target device are/is determined based on the reply message. P2P connection is sent to the target device according to the mac address and/or the device name of the target device. A TCP connection request sent from the target device is received when the device works as a group owner and the device works as a group client, wherein the TCP connection request carries the IP address of the target device. The TCP connection request is parsed to obtain the IP address of the target device.

In some embodiments of the disclosure, the processor 62 is further configured to obtain the IP address of the target device when it is determined that the device works as the group client and the target device works as the group owner.

In some embodiments of the disclosure, the processor 62 is configured to establish a data transmission channel with the target device corresponding to the IP address according to DLNA communication protocol by the following. The unicast message is sent to the target device corresponding to the IP address. Address information of a description file returned from the target device is received. The description file is obtained from an address corresponding to the address information of the description file. The description file includes the described information of the target device. The description information of the target device is saved into the device list according to the description information.

In some embodiments of the disclosure, the processor 62 is configured to send the first discovery request by the following. The processor 62 is configured to send a multicast search message. In some embodiments of the disclosure, the processor 62 is configured to send the second discovery request when it is determined that no target device is discovered according to an response result to the first discovery request by the following. The processor 62 is configured to send the second discovery request when the acknowledgement message for the multicast search message is not received within a preset time period.

In some embodiments of the disclosure, the processor 62 is configured to send the first discovery request by the following. The processor 62 is configured to send the multicast search message. The processor 62 is configured to send the second discovery request when it is determined that no target device is discovered according to the response result to the first discovery request by the following. The processor 62 is configured to resend the first discovery request when the acknowledgement message for the multicast search message is not received, and sends the second discovery request when the number of times the acknowledgement message for the multicast search message is not received exceeds a preset number of times.

In some embodiments of the disclosure, the processor 62 is further configured to: send the IP address of the target device to the target device so as to make the target device initialize DLNA service according to DLNA communication protocol and the IP address of the target device.

Besides, an embodiment of the disclosure further provides a computer readable non-volatile storage medium. The non-volatile storage medium stores computer programs. The computer programs are executed by a processor to implement the cast method in the embodiments.

It should be understood that the disclosure is not limited to an accurate structure described above and shown in the drawings, and various modifications and changes can be made without departing from the scope. The scope of the disclosure is limited only by the appended claims.

What is claimed is:

1. A multimedia apparatus, comprising:
    at least one processor, configured to
        determine a selected device from a plurality of devices during a multi-path cast process, wherein in the multi-path cast process, contents from the plurality of devices are configured to cast on the multimedia apparatus,
        receive audio data and video data from the plurality of devices,
        after the selected device is determined:
            store audio data sent from the selected device in an audio buffer and discard audio data sent from other devices in the plurality of devices except the selected device, and
            store video data sent from the plurality of devices in video buffers corresponding to the plurality of devices, wherein a video buffer of the video buffers is assigned to a device of the plurality of devices;
    a display, configured to display at least one path of video data in at least one video buffer of the video buffers; and
    an audio output circuit, configured to play the audio data sent from the selected device in the audio buffer.

2. The multimedia apparatus according to claim 1, wherein the at least one processor is further configured to:
    while the at least one path of video data in at least one video buffer being played on the display, receive an operation on a first path of video data among the at least video data from a user, determine a device corresponding to the first path of video data as the selected device.

3. The multimedia apparatus according to claim 1, wherein the at least one processor is further configured to:
    before the multi-path cast process, receive a first discovery request from a first device according to DLNA protocol; and
    return an acknowledgement message and a description file of a digital media render (DMR) to the first device as a reply to the first discovery request, wherein the multimedia apparatus and the first device are connected via a router.

4. The multimedia apparatus according to claim 3, wherein the at least one processor is further configured to:
    in response to no acknowledgement message being sent to the first device as a reply to the first discovery request, receive a second discovery request sent from the first device according to peer-to-peer communication.

5. The multimedia apparatus according to claim 4, wherein the at least one processor is further configured to:
    return a message comprising a MAC address and/or device name of the multimedia apparatus as a reply to the second discovery request.

6. The multimedia apparatus according to claim 5, wherein the at least one processor is further configured to:
    perform negotiation with the first device to determine which device works as a group owner and which device works as a group client.

7. The multimedia apparatus according to claim 6, wherein the at least one processor is further configured to:
    in response to the first device being determined as the group owner and the multimedia apparatus being determined as the group client, send a TCP connection request to the first device which has created a TCP server, wherein the TCP connection request carries IP address of the multimedia apparatus.

8. The multimedia apparatus according to claim 7, wherein the at least one processor is further configured to:
    receive IP address of the multimedia apparatus and IP address of the first device sent from the first device according to TCP communication;
    initiate DLNA service according to DLNA service and IP address of the display apparatus; and
    establish a data transmission channel with the first device via unicast.

9. The multimedia apparatus according to claim 1, wherein the at least one processor is further configured to:
    detect a connection status of the plurality of devices during the multi-path cast process between the display apparatus and the plurality of devices;
    in response to that it is detected that the selected device is disconnected, delete the audio data in the audio buffer and release memory space of the video buffer corresponding to the selected device, and determine a new device from the rest of devices; and
    store audio data sent from the new device in the audio buffer.

10. The multimedia apparatus according to claim 1, wherein the at least one processor is further configured to:
    release memory space of the audio buffer in response to that it is detected that the plurality of devices are disconnected.

11. A cast method for a display apparatus, comprising:
    during a multi-path cast process for casting contents from a plurality of devices on the display apparatus, determining a selected device from the plurality of devices, receiving audio data and video data from the plurality of devices, after the selected device is determined:

storing audio data sent from the selected device in an audio buffer of the display apparatus and discarding audio data sent from other devices in the plurality of devices except the selected device, and storing video data sent from the plurality of devices in video buffers corresponding to the plurality of devices, wherein a video buffer of the video buffers is assigned to a device of the plurality of devices;

displaying at least one path of video data in at least one video buffer of the video buffers on a display of the display apparatus; and playing the audio data sent from the selected device in the audio buffer.

12. The method according to claim 11, further comprising:

while the at least one path of video data in at least one video buffer being played on the display of the display apparatus, receiving an operation on a first path of video data among the at least video data from a user, determining a device corresponding to the first path of video data as the selected device.

13. The method according to claim 11, further comprising:

before the multi-path cast process, receiving a first discovery request from a first device according to DLNA protocol; and returning an acknowledgement message and a description file of a digital media render (DMR) to the first device as a reply to the first discovery request, wherein the display apparatus and the first device are connected via a router.

14. The method according to claim 13, further comprising:

in response to no acknowledgement message being sent to the first device as a reply to the first discovery request, receiving a second discovery request sent from the first device according to peer-to-peer communication.

15. The method according to claim 14, further comprising:

returning a message comprising a MAC address and/or device name of the display apparatus as a reply to the second discovery request.

16. The method according to claim 15, further comprising:

performing negotiation with the first device to determine which device works as a group owner and which device works as a group client.

17. The method according to claim 16, further comprising in response to the first device being determined as the group owner and the display apparatus being determined as the group client, sending a TCP connection request to the first device which has created a TCP server, wherein the TCP connection request carries IP address of the display apparatus.

18. The method according to claim 17, further comprising:

receiving IP address of the display apparatus and IP address of the first device sent from the first device according to TCP communication;

initiating DLNA service according to DLNA service and IP address of the display apparatus; and establishing a data transmission channel with the first device via unicast.

19. The method according to claim 11, further comprising:

detecting a connection status of the plurality of devices during the multi-path cast process between the display apparatus and the plurality of devices;

in response to that it is detected that the selected device is disconnected, deleting the audio data in the audio buffer and releasing memory space of the video buffer corresponding to the target selected device, and determining a new device from the rest of devices; and storing audio data sent from the new device in the audio buffer.

20. The method according to claim 11, further comprising:

releasing memory space of the audio buffer in response to that it is detected that the plurality of devices are disconnected.

* * * * *